US011214844B2

(12) United States Patent
Purcell et al.

(10) Patent No.: US 11,214,844 B2
(45) Date of Patent: Jan. 4, 2022

(54) BIOFABRICATED LEATHER ARTICLES HAVING ZONAL PROPERTIES

(71) Applicant: MODERN MEADOW, INC., Nutley, NJ (US)

(72) Inventors: Brendan Patrick Purcell, Brooklyn, NY (US); Suzanne Lee, Brooklyn, NY (US); Lixin Dai, Livingston, NJ (US); Katherine Amy Congdon, Suffolk (GB); Stephen M. Spinella, Brooklyn, NY (US); Chi Man Ng, Brooklyn, NY (US)

(73) Assignee: Modern Meadow, Inc., Nutley, NJ (US)

( * ) Notice: Subject to any disclaimer, the term of this patent is extended or adjusted under 35 U.S.C. 154(b) by 149 days.

(21) Appl. No.: 16/189,692

(22) Filed: Nov. 13, 2018

(65) Prior Publication Data
US 2019/0144957 A1 May 16, 2019

Related U.S. Application Data

(60) Provisional application No. 62/585,391, filed on Nov. 13, 2017.

(51) Int. Cl.
*C14B 7/04* (2006.01)
*C14C 7/00* (2006.01)
*C14C 13/00* (2006.01)
*C08H 1/06* (2006.01)
*C08L 89/06* (2006.01)
*D06N 3/00* (2006.01)
*D06N 3/12* (2006.01)

(52) U.S. Cl.
CPC .................. *C14B 7/04* (2013.01); *C08H 1/06* (2013.01); *C08L 89/06* (2013.01); *C14C 7/00* (2013.01); *C14C 13/00* (2013.01); *D06N 3/0018* (2013.01); *D06N 3/12* (2013.01); *D06N 2211/28* (2013.01)

(58) Field of Classification Search
CPC ........ Y10T 428/249921; A61K 38/014; A61K 38/4886; C14C 7/00; C14C 13/00; C14B 7/04
See application file for complete search history.

(56) References Cited

U.S. PATENT DOCUMENTS

| | | | |
|---|---|---|---|
| 2,059,856 A | 11/1936 | Eastman et al. |
| 2,673,171 A | 3/1954 | Leon et al. |
| 2,934,446 A | 4/1960 | Highberger et al. |
| 3,073,714 A | 1/1963 | Shu-Tung et al. |
| 3,122,599 A | 2/1964 | Shu-Tung et al. |
| 3,136,682 A | 6/1964 | Shu-Tung et al. |
| 3,483,016 A | 12/1969 | McCool et al. |
| 3,497,363 A | 2/1970 | Fox, Jr. et al. |
| 3,512,993 A | 5/1970 | Conley et al. |
| 3,537,871 A | 11/1970 | Kaneko et al. |
| 3,562,820 A | 2/1971 | Braun et al. |
| 3,656,881 A | 4/1972 | Hemwall |
| 3,684,732 A | 8/1972 | Grabauskas et al. |
| 3,728,207 A | 4/1973 | Heling et al. |
| 3,811,832 A | 5/1974 | Briggs |
| 3,873,478 A | 3/1975 | Comte et al. |
| 3,921,313 A | 11/1975 | Mahide et al. |
| 3,956,560 A | 5/1976 | Smith et al. |
| 3,979,532 A | 9/1976 | Muck et al. |
| 4,089,333 A | 5/1978 | Utsuo et al. |
| 4,215,051 A | 7/1980 | Palmer et al. |
| 4,247,279 A | 1/1981 | Masters |
| 4,291,992 A | 9/1981 | Barr et al. |
| 4,294,241 A | 10/1981 | Miyata |
| 4,404,033 A | 9/1983 | Steffan |
| 4,407,956 A | 10/1983 | Howell |
| 4,455,206 A | 6/1984 | Funabashi et al. |
| 4,464,428 A | 8/1984 | Ebert et al. |
| 4,465,472 A | 8/1984 | Urbaniak |
| 4,536,475 A | 8/1985 | Anderson |
| 4,564,597 A | 1/1986 | Lerner et al. |
| 4,585,139 A | 4/1986 | Bronson et al. |
| 4,640,529 A | 2/1987 | Katz |
| 4,646,106 A | 2/1987 | Howkins |
| 4,665,492 A | 5/1987 | Masters |
| 4,673,304 A | 6/1987 | Liu et al. |
| 4,684,611 A | 8/1987 | Schilperoort et al. |
| 4,736,866 A | 4/1988 | Leder et al. |
| 4,772,141 A | 9/1988 | Sanders et al. |
| 4,842,575 A | 6/1989 | Hoffman et al. |
| 4,889,438 A | 12/1989 | Forsyth et al. |
| 4,896,980 A | 1/1990 | Sanders et al. |
| 4,921,365 A | 5/1990 | Sanders et al. |
| 4,945,050 A | 7/1990 | Sanford et al. |
| 4,948,280 A | 8/1990 | Sanders et al. |
| 4,969,758 A | 11/1990 | Sanders et al. |
| 4,970,168 A | 11/1990 | Tumer |
| 4,980,112 A | 12/1990 | Masters |
| 4,980,403 A | 12/1990 | Bateman et al. |
| 5,016,121 A | 5/1991 | Peddle et al. |
| 5,039,297 A | 8/1991 | Masters |
| 5,040,911 A | 8/1991 | Sanders et al. |
| 5,108,424 A | 4/1992 | Hoffman et al. |
| 5,134,178 A | 7/1992 | Nishibori |
| 5,134,569 A | 7/1992 | Masters |
| 5,153,067 A | 10/1992 | Yoshida et al. |
| 5,171,273 A | 12/1992 | Silver et al. |

(Continued)

FOREIGN PATENT DOCUMENTS

| | | |
|---|---|---|
| CA | 2306346 A1 | 1/1999 |
| CN | 1305546 A | 7/2001 |

(Continued)

OTHER PUBLICATIONS

Ren et al., "Engineering zonal cartilage through bioprinting collagen type II hydrogel constructs with biomimetic chondrocyte density gradient," BMC Musculoskeletal Disorders (2016) 17:301. (Year: 2016).*

(Continued)

Primary Examiner — Jeremy R Pierce
(74) Attorney, Agent, or Firm — Sterne, Kessler, Goldstein & Fox P.L.L.C

(57) ABSTRACT

The invention herein provides biofabricated materials having zonal properties and methods of making biofabricated materials having zonal properties.

15 Claims, No Drawings

(56) References Cited

U.S. PATENT DOCUMENTS

| | | |
|---|---|---|
| 5,185,253 A | 2/1993 | Turner |
| 5,204,055 A | 4/1993 | Sachs et al. |
| 5,216,606 A | 6/1993 | Lentz et al. |
| 5,229,112 A | 7/1993 | Obukowicz et al. |
| 5,304,730 A | 4/1994 | Lawson et al. |
| 5,349,124 A | 9/1994 | Fischhoff et al. |
| 5,362,865 A | 11/1994 | Austin |
| 5,378,619 A | 1/1995 | Rogers |
| 5,424,412 A | 6/1995 | Brown et al. |
| 5,487,992 A | 1/1996 | Capecchi et al. |
| 5,490,962 A | 2/1996 | Cima et al. |
| 5,492,937 A | 2/1996 | Bogentoft et al. |
| 5,495,071 A | 2/1996 | Fischhoff et al. |
| 5,503,999 A | 4/1996 | Jilka et al. |
| 5,510,253 A | 4/1996 | Mitsky et al. |
| 5,546,313 A | 8/1996 | Masters |
| 5,589,612 A | 12/1996 | Jilka et al. |
| 5,593,859 A | 1/1997 | Prockop et al. |
| 5,593,874 A | 1/1997 | Brown et al. |
| 5,599,695 A | 2/1997 | Pease et al. |
| 5,602,321 A | 2/1997 | John |
| 5,605,662 A | 2/1997 | Heller et al. |
| 5,614,396 A | 3/1997 | Bradley et al. |
| 5,627,061 A | 5/1997 | Barry et al. |
| 5,631,152 A | 5/1997 | Fry et al. |
| 5,633,435 A | 5/1997 | Barry et al. |
| 5,658,802 A | 8/1997 | Hayes et al. |
| 5,659,122 A | 8/1997 | Austin |
| 5,689,052 A | 11/1997 | Brown et al. |
| 5,697,324 A | 12/1997 | Van Der Lely |
| 5,702,717 A | 12/1997 | Cha et al. |
| 5,716,837 A | 2/1998 | Barry et al. |
| 5,739,832 A | 4/1998 | Heinzl et al. |
| 5,763,241 A | 6/1998 | Fischhoff et al. |
| 5,763,245 A | 6/1998 | Greenplate et al. |
| 5,792,933 A | 8/1998 | Ma |
| 5,797,898 A | 8/1998 | Santini, Jr. et al. |
| 5,798,779 A | 8/1998 | Nakayasu et al. |
| 5,804,425 A | 9/1998 | Barry et al. |
| 5,824,838 A | 10/1998 | Melmed et al. |
| 5,831,070 A | 11/1998 | Pease et al. |
| 5,859,347 A | 1/1999 | Brown et al. |
| 5,866,121 A | 2/1999 | Coffino et al. |
| 5,869,720 A | 2/1999 | John |
| 5,929,208 A | 7/1999 | Heller et al. |
| 5,932,056 A | 8/1999 | Mark et al. |
| 5,932,439 A | 8/1999 | Bogosian |
| 5,959,091 A | 9/1999 | Watrud et al. |
| 5,959,179 A | 9/1999 | Hinchee et al. |
| 5,981,841 A | 11/1999 | Santino et al. |
| 6,087,102 A | 7/2000 | Chenchik et al. |
| 6,103,528 A | 8/2000 | An et al. |
| 6,109,717 A | 8/2000 | Kane et al. |
| 6,123,861 A | 9/2000 | Santini, Jr. et al. |
| 6,132,468 A | 10/2000 | Mansmann |
| 6,139,831 A | 10/2000 | Shivashankar et al. |
| 6,171,797 B1 | 1/2001 | Perbost |
| 6,197,575 B1 | 3/2001 | Griffith et al. |
| 6,239,273 B1 | 5/2001 | Pease et al. |
| 6,261,493 B1 | 7/2001 | Gaylo et al. |
| 6,277,600 B1 | 8/2001 | Tomita et al. |
| 6,336,480 B2 | 1/2002 | Gaylo et al. |
| 6,365,650 B1 | 4/2002 | Chen et al. |
| 6,368,361 B1 | 4/2002 | Yayabe et al. |
| 6,383,549 B1 | 5/2002 | Agostinelli |
| 6,387,707 B1 | 5/2002 | Seul et al. |
| 6,394,585 B1 | 5/2002 | Ross |
| 6,402,403 B1 | 6/2002 | Speakman |
| 6,419,883 B1 | 7/2002 | Blanchard |
| 6,428,978 B1 | 8/2002 | Olsen et al. |
| 6,451,346 B1 | 9/2002 | Shah et al. |
| 6,454,811 B1 | 9/2002 | Sherwood et al. |
| 6,455,311 B1 | 9/2002 | Vacanti |
| 6,495,102 B1 | 12/2002 | Suslick et al. |
| 6,497,510 B1 | 12/2002 | Delametter et al. |
| 6,511,958 B1 | 1/2003 | Atkinson et al. |
| 6,514,518 B2 | 2/2003 | Monkhouse et al. |
| 6,517,648 B1 | 2/2003 | Bouchette et al. |
| 6,527,378 B2 | 3/2003 | Rausch et al. |
| 6,536,873 B1 | 3/2003 | Lee et al. |
| 6,536,895 B2 | 3/2003 | Kashiwagi et al. |
| 6,538,089 B1 | 3/2003 | Samra et al. |
| 6,543,872 B2 | 4/2003 | Ohtsuka et al. |
| 6,547,994 B1 | 4/2003 | Monkhouse et al. |
| 6,548,263 B1 | 4/2003 | Kapur et al. |
| 6,550,904 B2 | 4/2003 | Koitabashi et al. |
| 6,561,626 B1 | 5/2003 | Min et al. |
| 6,561,642 B2 | 5/2003 | Gonzalez |
| 6,565,176 B2 | 5/2003 | Anderson et al. |
| 6,708,531 B1 | 3/2004 | Thanikaivelan et al. |
| 6,733,859 B2 | 5/2004 | Yoneda et al. |
| 6,762,336 B1 | 7/2004 | MacPhee et al. |
| 6,800,384 B2 | 10/2004 | Suzuki et al. |
| 6,835,390 B1 | 12/2004 | Vein |
| 6,942,830 B2 | 9/2005 | Muelhaupt et al. |
| 6,979,670 B1 | 12/2005 | Lyngstadaas et al. |
| 7,004,978 B2 | 2/2006 | Kando et al. |
| 7,051,654 B2 | 5/2006 | Boland et al. |
| 7,056,845 B2 | 6/2006 | Waeber et al. |
| 7,166,464 B2 | 1/2007 | McAllister et al. |
| 7,270,829 B2 | 9/2007 | Van Eelen |
| 7,625,198 B2 | 12/2009 | Lipson et al. |
| 7,812,075 B2 | 10/2010 | Hong |
| 7,882,717 B2 | 2/2011 | Widdemer |
| 8,076,137 B2 | 12/2011 | McAllister et al. |
| 8,076,385 B2 | 12/2011 | Ohama |
| 8,153,176 B2 | 4/2012 | Etayo Garralda et al. |
| 8,188,230 B2 | 5/2012 | Van Heerde et al. |
| 8,328,878 B2 | 12/2012 | Zhang |
| 8,343,522 B2 | 1/2013 | Pohl et al. |
| 8,491,668 B2 | 7/2013 | Hinestroza et al. |
| 8,628,837 B2 | 1/2014 | Kusuura |
| 8,679,197 B2 | 3/2014 | Hinestroza et al. |
| 8,703,216 B2 | 4/2014 | Forgacs et al. |
| 8,741,415 B2 | 6/2014 | Kusuura |
| 8,785,195 B2 | 7/2014 | Takeuchi et al. |
| 8,916,263 B2 | 12/2014 | Kusuura |
| 9,023,619 B2 | 5/2015 | De Boer |
| 9,103,066 B2 | 8/2015 | Kusuura |
| 9,163,205 B2 | 10/2015 | Sivik et al. |
| 9,163,338 B2 | 10/2015 | Schauer et al. |
| 9,181,404 B2 | 11/2015 | Neresini et al. |
| 9,259,455 B2 | 2/2016 | Song et al. |
| 9,332,779 B2 | 5/2016 | Marga |
| 9,428,817 B2 | 8/2016 | Greene |
| 9,439,813 B2 | 9/2016 | Terada |
| 9,518,106 B2 | 12/2016 | Saeidi et al. |
| 9,539,363 B2 | 1/2017 | Shimp |
| 9,708,757 B2 | 7/2017 | Viladot Petit et al. |
| 9,733,393 B2 | 8/2017 | Liu et al. |
| 9,752,122 B2 | 9/2017 | Marga et al. |
| 9,821,089 B2 | 11/2017 | Haj-Ali et al. |
| 10,124,543 B1 | 11/2018 | Tymon et al. |
| 10,131,096 B1 | 11/2018 | Tymon et al. |
| 10,138,595 B1 | 11/2018 | Tymon |
| 10,259,191 B2 | 4/2019 | Wijesena et al. |
| 10,273,549 B2 | 4/2019 | Helgason et al. |
| 10,294,611 B2 | 5/2019 | Eryilmaz et al. |
| 10,301,440 B2 | 5/2019 | Purcell et al. |
| 10,370,504 B2 | 8/2019 | Purcell et al. |
| 10,370,505 B2 | 8/2019 | Purcell et al. |
| 10,519,285 B2 | 12/2019 | Purcell et al. |
| 2002/0031500 A1 | 3/2002 | MacLaughlin et al. |
| 2002/0059049 A1 | 5/2002 | Bradbury et al. |
| 2002/0064808 A1 | 5/2002 | Mutz et al. |
| 2002/0064809 A1 | 5/2002 | Mutz et al. |
| 2002/0084290 A1 | 7/2002 | Materna |
| 2002/0089561 A1 | 7/2002 | Weitzel et al. |
| 2002/0090720 A1 | 7/2002 | Mutz et al. |
| 2002/0106412 A1 | 8/2002 | Rowe et al. |
| 2002/0142391 A1 | 10/2002 | Kivirikko et al. |
| 2002/0160109 A1 | 10/2002 | Yeo et al. |
| 2002/0164319 A1 | 11/2002 | Khaw et al. |
| 2002/0173586 A1 | 11/2002 | Jeong et al. |

(56) References Cited

U.S. PATENT DOCUMENTS

| | | |
|---|---|---|
| 2002/0182633 A1 | 12/2002 | Chen et al. |
| 2002/0188349 A1 | 12/2002 | McAllister et al. |
| 2003/0012805 A1 | 1/2003 | Chen et al. |
| 2003/0027332 A1 | 2/2003 | Lafrance et al. |
| 2003/0031500 A1 | 2/2003 | Bouveresse |
| 2003/0032203 A1 | 2/2003 | Sabatini et al. |
| 2003/0059537 A1 | 3/2003 | Chilkoti et al. |
| 2003/0100824 A1 | 5/2003 | Warren et al. |
| 2003/0113433 A1 | 6/2003 | Tempesta |
| 2003/0118560 A1* | 6/2003 | Kelly ............... A61L 27/507 424/93.7 |
| 2003/0129699 A1 | 7/2003 | Perret et al. |
| 2003/0134120 A1 | 7/2003 | Kim et al. |
| 2003/0153078 A1 | 8/2003 | Libera et al. |
| 2003/0175410 A1 | 9/2003 | Campbell et al. |
| 2003/0190438 A1 | 10/2003 | Suzuki et al. |
| 2003/0207638 A1 | 11/2003 | Bowlin et al. |
| 2004/0005663 A1 | 1/2004 | Bell et al. |
| 2004/0018226 A1 | 1/2004 | Wnek et al. |
| 2004/0018592 A1* | 1/2004 | Bell ............... C12N 15/8257 435/69.1 |
| 2004/0037813 A1 | 2/2004 | Simpson et al. |
| 2004/0039727 A1 | 2/2004 | Dessloch et al. |
| 2004/0116032 A1* | 6/2004 | Bowlin ............... A61L 27/26 442/414 |
| 2004/0219133 A1 | 11/2004 | Lyles |
| 2004/0237208 A1 | 12/2004 | Day |
| 2005/0084719 A1 | 4/2005 | Yoshimoto et al. |
| 2005/0118326 A1 | 6/2005 | Anfinsen et al. |
| 2005/0129730 A1 | 6/2005 | Pang et al. |
| 2005/0163912 A1 | 7/2005 | White |
| 2005/0202268 A1 | 9/2005 | Kotter et al. |
| 2005/0261427 A1 | 11/2005 | Saito |
| 2005/0276791 A1 | 12/2005 | Hansford et al. |
| 2006/0121006 A1 | 6/2006 | Chancellor et al. |
| 2006/0141479 A1 | 6/2006 | Song et al. |
| 2006/0270037 A1 | 11/2006 | Kato et al. |
| 2007/0088341 A1 | 4/2007 | Skiba et al. |
| 2007/0142916 A1 | 6/2007 | Olson et al. |
| 2007/0184742 A1 | 8/2007 | Coulson et al. |
| 2007/0231787 A1 | 10/2007 | Voelker |
| 2007/0238167 A1 | 10/2007 | Perez et al. |
| 2007/0292702 A1 | 12/2007 | Saumweber |
| 2008/0070304 A1 | 3/2008 | Forgacs et al. |
| 2008/0103287 A1 | 5/2008 | Chino et al. |
| 2008/0171994 A1 | 7/2008 | Williams et al. |
| 2008/0242822 A1 | 10/2008 | West |
| 2009/0005867 A1 | 1/2009 | Lefranc et al. |
| 2009/0041907 A1 | 2/2009 | Etayo Garralda et al. |
| 2009/0069893 A1 | 3/2009 | Paukshto et al. |
| 2009/0142307 A1 | 6/2009 | Athanasiou et al. |
| 2009/0162896 A1 | 6/2009 | Scheibel |
| 2009/0208466 A1 | 8/2009 | Yoo et al. |
| 2009/0209823 A1 | 8/2009 | Yamane |
| 2009/0248145 A1 | 10/2009 | Chan et al. |
| 2010/0041134 A1 | 2/2010 | Forgacs et al. |
| 2010/0087854 A1 | 4/2010 | Stopek et al. |
| 2010/0189712 A1 | 7/2010 | L'Heureux et al. |
| 2010/0256314 A1 | 10/2010 | Marsden et al. |
| 2010/0325811 A1 | 12/2010 | Kashiwagura et al. |
| 2011/0151231 A1 | 6/2011 | Chomarat |
| 2011/0151563 A1 | 6/2011 | Paukshto et al. |
| 2011/0165301 A1 | 7/2011 | Blumenthal |
| 2011/0212179 A1 | 9/2011 | Liu |
| 2011/0212501 A1 | 9/2011 | Yoo |
| 2011/0250308 A1 | 10/2011 | Jun et al. |
| 2011/0288274 A1 | 11/2011 | Russell et al. |
| 2012/0010119 A1 | 1/2012 | Cunningham |
| 2012/0023777 A1 | 2/2012 | Greene |
| 2012/0040119 A1 | 2/2012 | Gagnieu et al. |
| 2012/0053689 A1 | 3/2012 | Martin et al. |
| 2012/0116053 A1 | 5/2012 | Mirochnitchenko. et al. |
| 2012/0116568 A1 | 5/2012 | Murphy et al. |
| 2012/0164200 A1 | 6/2012 | Qin et al. |
| 2012/0190473 A1 | 7/2012 | Swist |
| 2012/0230950 A1 | 9/2012 | Niklason et al. |
| 2012/0273993 A1 | 11/2012 | Shoseyov et al. |
| 2012/0276203 A1 | 11/2012 | Selim et al. |
| 2012/0316646 A1 | 12/2012 | Gretzer et al. |
| 2013/0029008 A1 | 1/2013 | Forgacs et al. |
| 2013/0131781 A1 | 5/2013 | Greenhalgh et al. |
| 2013/0142763 A1 | 6/2013 | Carlson et al. |
| 2013/0215598 A1 | 8/2013 | Guzan et al. |
| 2013/0255003 A1 | 10/2013 | Forgacs et al. |
| 2013/0256064 A1 | 10/2013 | Bongaerts et al. |
| 2013/0287896 A1 | 10/2013 | Harel et al. |
| 2014/0005663 A1 | 1/2014 | Heard et al. |
| 2014/0017284 A1 | 1/2014 | Yang et al. |
| 2014/0021703 A1 | 1/2014 | Scharf et al. |
| 2014/0093618 A1 | 4/2014 | Forgacs et al. |
| 2014/0193477 A1 | 7/2014 | Chaikof et al. |
| 2014/0205729 A1 | 7/2014 | Didzbalis et al. |
| 2014/0215850 A1 | 8/2014 | Redl et al. |
| 2014/0264079 A1 | 9/2014 | Tarahomi et al. |
| 2015/0013299 A1 | 1/2015 | Haj-Ali et al. |
| 2015/0079238 A1 | 3/2015 | Marga et al. |
| 2015/0216216 A1 | 8/2015 | Marga |
| 2015/0306276 A1 | 10/2015 | Shimp |
| 2016/0097109 A1* | 4/2016 | Forgacs ............... C14C 13/00 435/70.3 |
| 2016/0097154 A1 | 4/2016 | Dumbrique et al. |
| 2016/0106674 A1 | 4/2016 | Scalesciani |
| 2016/0227831 A1 | 8/2016 | Marga |
| 2016/0250831 A1 | 9/2016 | Gladish et al. |
| 2016/0280960 A1 | 9/2016 | Leimer et al. |
| 2016/0348078 A1 | 12/2016 | Forgacs et al. |
| 2016/0376737 A1 | 12/2016 | Marga et al. |
| 2017/0152301 A1 | 6/2017 | Koob et al. |
| 2017/0233836 A1 | 8/2017 | Jakab et al. |
| 2017/0233943 A1 | 8/2017 | Purcell et al. |
| 2017/0233944 A1 | 8/2017 | Purcell et al. |
| 2017/0233945 A1 | 8/2017 | Purcell et al. |
| 2017/0298565 A1 | 10/2017 | Eryilmaz et al. |
| 2018/0084792 A1 | 3/2018 | Garcia et al. |
| 2018/0105659 A1 | 4/2018 | Hu et al. |
| 2018/0119318 A1 | 5/2018 | Morales |
| 2018/0230644 A1 | 8/2018 | Purcell et al. |
| 2018/0237592 A1 | 8/2018 | Celia |
| 2018/0282937 A1 | 10/2018 | Bainbridge et al. |
| 2018/0371665 A1 | 12/2018 | Lin et al. |
| 2019/0024303 A1 | 1/2019 | Lee et al. |
| 2019/0032275 A1 | 1/2019 | Zhou et al. |
| 2019/0127907 A1 | 5/2019 | Eryilmaz et al. |
| 2019/0136060 A1 | 5/2019 | Helgason et al. |
| 2019/0203000 A1 | 7/2019 | Purcell et al. |
| 2019/0226141 A1 | 7/2019 | Aydin et al. |
| 2020/0199695 A1 | 6/2020 | Forgacs et al. |
| 2020/0207932 A1 | 7/2020 | Purcell et al. |
| 2020/0231805 A1 | 7/2020 | Teglia et al. |
| 2020/0370215 A1 | 11/2020 | Marga et al. |
| 2021/0023764 A1 | 1/2021 | Babin et al. |

FOREIGN PATENT DOCUMENTS

| | | |
|---|---|---|
| CN | 101946852 A | 1/2011 |
| CN | 102105075 A | 6/2011 |
| CN | 102906318 A | 1/2013 |
| CN | 203021702 U | 6/2013 |
| CN | 203021703 U | 6/2013 |
| CN | 203021840 U | 6/2013 |
| CN | 203021842 U | 6/2013 |
| CN | 203021843 U | 6/2013 |
| CN | 103231577 A | 8/2013 |
| CN | 103233321 A | 8/2013 |
| CN | 103233322 A | 8/2013 |
| CN | 103233324 A | 8/2013 |
| CN | 103233325 A | 8/2013 |
| CN | 103233326 A | 8/2013 |
| CN | 103255504 A | 8/2013 |
| CN | 103255506 A | 8/2013 |
| CN | 103255508 A | 8/2013 |
| CN | 103255509 A | 8/2013 |
| CN | 103255579 A | 8/2013 |
| CN | 103255581 A | 8/2013 |

(56) References Cited

FOREIGN PATENT DOCUMENTS

| | | |
|---|---|---|
| CN | 103255586 A | 8/2013 |
| CN | 103256796 A | 8/2013 |
| CN | 103266425 A | 8/2013 |
| CN | 103276531 A | 9/2013 |
| CN | 203174344 U | 9/2013 |
| CN | 203174410 U | 9/2013 |
| CN | 203174411 U | 9/2013 |
| CN | 203174412 U | 9/2013 |
| CN | 203174413 U | 9/2013 |
| CN | 203174414 U | 9/2013 |
| CN | 203174415 U | 9/2013 |
| CN | 203174416 U | 9/2013 |
| CN | 203174417 U | 9/2013 |
| CN | 203174418 U | 9/2013 |
| CN | 203174419 U | 9/2013 |
| CN | 203291935 U | 11/2013 |
| CN | 203295678 U | 11/2013 |
| CN | 203295679 U | 11/2013 |
| CN | 203295689 U | 11/2013 |
| CN | 203295690 U | 11/2013 |
| CN | 203295794 U | 11/2013 |
| CN | 203295796 U | 11/2013 |
| CN | 203298579 U | 11/2013 |
| CN | 203307577 U | 11/2013 |
| CN | 102995165 B | 1/2015 |
| CN | 103252276 B | 1/2015 |
| CN | 204112009 U | 1/2015 |
| CN | 204112011 U | 1/2015 |
| CN | 103014924 B | 2/2015 |
| CN | 103231576 B | 4/2015 |
| CN | 103255653 B | 4/2015 |
| CN | 104603293 A | 5/2015 |
| CN | 104695205 A | 6/2015 |
| CN | 105102711 A | 11/2015 |
| CN | 205347859 U | 6/2016 |
| CN | 205361168 U | 7/2016 |
| CN | 106987931 A | 7/2017 |
| CN | 207193461 U | 4/2018 |
| CN | 108660607 A | 10/2018 |
| CN | 208419533 U | 1/2019 |
| EP | 0067553 A2 | 12/1982 |
| EP | 0078040 A2 | 5/1983 |
| EP | 0089029 A2 | 9/1983 |
| EP | 0388854 A2 | 9/1990 |
| EP | 0421450 A2 | 4/1991 |
| EP | 0426641 A2 | 5/1991 |
| EP | 0470399 A2 | 2/1992 |
| EP | 0531273 A2 | 3/1993 |
| EP | 0578627 A1 | 1/1994 |
| EP | 0388854 B1 | 11/1994 |
| EP | 0709462 A2 | 5/1996 |
| EP | 1589091 A1 | 10/2005 |
| EP | 1589098 A1 | 10/2005 |
| EP | 1232182 B1 | 10/2007 |
| EP | 2003239 A1 | 12/2008 |
| EP | 2090584 A1 | 8/2009 |
| EP | 2148887 A2 | 2/2010 |
| EP | 2319337 A1 | 5/2011 |
| EP | 2 721 941 A1 | 4/2014 |
| EP | 2148887 B1 | 4/2014 |
| EP | 3205668 A1 | 8/2017 |
| FR | 2188610 A5 | 1/1974 |
| GB | 723214 A | 2/1955 |
| GB | 723215 A | 2/1955 |
| GB | 992585 A | 5/1965 |
| GB | 1024769 A | 4/1966 |
| GB | 1367490 A | 9/1974 |
| JP | S58146345 A | 8/1983 |
| JP | S60203264 A | 10/1985 |
| JP | H04146273 A | 5/1992 |
| JP | H05184661 A | 7/1993 |
| JP | H05279966 A | 10/1993 |
| JP | 6017378 A | 1/1994 |
| JP | H06158546 A | 6/1994 |
| JP | H06198800 A | 7/1994 |
| JP | H0770600 A | 3/1995 |
| JP | 9047502 A | 2/1997 |
| KR | 100716015 B1 | 5/2007 |
| WO | WO-8303224 A1 | 9/1983 |
| WO | WO-9119806 A1 | 12/1991 |
| WO | WO-9717459 A1 | 5/1997 |
| WO | WO-9730582 A1 | 8/1997 |
| WO | WO-9748814 A2 | 12/1997 |
| WO | WO-9808962 A1 | 3/1998 |
| WO | WO-9831812 A1 | 7/1998 |
| WO | WO-9845457 A1 | 10/1998 |
| WO | WO-9858069 A1 | 12/1998 |
| WO | WO-9907206 A1 | 2/1999 |
| WO | WO-9916890 A2 | 4/1999 |
| WO | WO-9931222 A1 | 6/1999 |
| WO | WO-9931223 A1 | 6/1999 |
| WO | WO-9931248 A1 | 6/1999 |
| WO | WO-9940210 A1 | 8/1999 |
| WO | WO-0160922 A1 | 8/2001 |
| WO | WO-0168811 A2 | 9/2001 |
| WO | WO-2005081970 A2 | 9/2005 |
| WO | WO-2007124023 A2 | 11/2007 |
| WO | WO-2009066635 A1 | 5/2009 |
| WO | WO-2009070720 A1 | 6/2009 |
| WO | WO-2009149181 A2 | 12/2009 |
| WO | WO-2010008905 A2 | 1/2010 |
| WO | WO-2010021738 A2 | 2/2010 |
| WO | WO-2010048281 A1 | 4/2010 |
| WO | WO-2010091251 A2 | 8/2010 |
| WO | WO-2011051983 A1 | 5/2011 |
| WO | WO-2012054195 A2 | 4/2012 |
| WO | WO-2012108907 A1 | 8/2012 |
| WO | WO-2013039118 A1 | 3/2013 |
| WO | WO-2013149083 A1 | 10/2013 |
| WO | WO-2014039938 A1 | 3/2014 |
| WO | WO-2014195426 A1 | 12/2014 |
| WO | WO-2014201406 A1 | 12/2014 |
| WO | WO-2016073453 A1 | 5/2016 |
| WO | WO-2017053433 A1 | 3/2017 |
| WO | WO-2017131196 A1 | 8/2017 |
| WO | WO-2017142892 A1 | 8/2017 |
| WO | WO-2018058874 A1 | 4/2018 |
| WO | WO-2018110819 A1 | 6/2018 |
| WO | WO-2018137041 A1 | 8/2018 |
| WO | WO-2018164020 A1 | 9/2018 |
| WO | WO-2018164234 A1 | 9/2018 |
| WO | WO-2018185246 A1 | 10/2018 |
| WO | WO-2018211994 A1 | 11/2018 |
| WO | WO 2019/017987 A1 | 1/2019 |
| WO | WO-2019007442 A2 | 1/2019 |
| WO | WO-2019065735 A1 | 4/2019 |
| WO | WO-2019110325 A1 | 6/2019 |
| WO | WO-2019110960 A1 | 6/2019 |
| WO | WO-2019117724 A1 | 6/2019 |
| WO | WO-2019149914 A1 | 8/2019 |
| WO | WO-2019158341 A1 | 8/2019 |

OTHER PUBLICATIONS

Sizeland, K.H., et al., "Collagen Orientation and Leather Strength for Selected Mammals", Journal of Agricultural and Food Chemistry, vol. 61, 2013, pp. 887-892.

Basil-Jones, M.M., et al., "Collagen Fibril Orientation in Ovine and Bovine Leather Affects Strength: A Small Angle X-ray Scattering (SAXS) Study", Journal of Agricultural and Food Chemistry, vol. 59, 2011, pp. 9972-9979.

Bailey, A.J., et al., "Irradiation-Induced Crosslinking of Collagen", Radiation Research, vol. 22, No. 4, Aug. 1964, pp. 606-621.

Housley, T., et al., "Collagen Crosslinking: Isolation of Hydroxyaldol-Histidine, a Naturally-Occurring Crosslink", Biochemical and Biophysical Research Communications, vol. 67, No. 2, 1975, pp. 824-830.

Siegel, R.C., "Biosynthesis of Collagen Crosslinks: Increased Activity of Purified Lysyl Oxidase with Reconstituted Collagen Fibrils", Proc. Nat. Acad. Sci. USA, vol. 71, No. 12, Dec. 1974, pp. 4826-4830.

(56) References Cited

OTHER PUBLICATIONS

Mechanic, G., et al., "The Nature of Crosslinking in Collagens from Mineralized Tissues", Biochemical and Biophysical Research Communications, vol. 45, No. 3, 1971, pp. 644-653.

Mechanic, G., et al., "Biochemistry of Collagen Crosslinking Isolation of a new Crosslink, Hydroxylysinohydroxynorleucine, and Its Reduced Precursor, Dihydroxynorleucine, from Bovine Tendon", Biochemical and Biophysical Research Communications, vol. 41, No. 6, 1970, pp. 1597-1604.

Shosan, et al., "Studies on Collagen Crosslinking in vivo", Biochim. Biophys. Acta, vol. 154, 1968, pp. 261-263.

Silva, T.H., et al., "Marine Origin Collagens and Its Potential Applications", Marine Drugs, vol. 12, 2014, pp. 5881-5901.

Extended European Search Report dated Apr. 18, 2019 in Patent Application No. 18205321.5, 7 pages.

Abedin, M.Z., et al., "Isolation and Native Characterization of Cysteine-rich Collagens From Bovine Placental Tissues and Uterus and Their Relationship to Types Iv and V Collagens," Bioscience Reports, 2(7):493-502, Portland Press on behalf of the Biochemical Society, England, (Jul. 1982).

Aldhous, Print me a heart and a set of arteries, New Scientist, Apr. 15, 2006, retrieved from the internet on Jun. 3, 2015. Retrieved from the Internet: (http://organprint.missouri.edu/www/news/NewScientistApril2006.pdf).

Apte, S.S., et al., "Cloning of the Human and Mouse Type X Collagen Genes and Mapping of the Mouse Type X Collagen Gene to Chromosome 10," European Journal of Biochemistry, 206(1):217-224, Blackwell Science Ltd. on behalf of the Federation of European Biochemical Societies, England, (May 1992).

Arding, Vegetarian cheese, Culture the word on cheese, 2 pgs, Dec. 3, 2013, retrieved from the internet on Oct. 31, 2014. Retrieved from the Internet: (URL: https://culturecheesemag.com/ask-the-monger/vegetarian-cheese).

Ayad, S., et al., "Bovine Cartilage Types VI and IX Collagens," Biochemical Journal, 262(3):753-761, Published by Portland Press on behalf of the Biochemical Society, England, (Sep. 1989).

Barnard, N.D., et al., "The Medical Costs Attributable to Meat Consumption," Preventive Medicine, 24(6):646-655, Academic Press, Inc (Nov. 1995).

Benjaminson, M.A., et al., "In Vitro Edible Muscle Protein Production System (MPPS): Stage 1, Fish," Acta Astronautica, 51(12):879-889, Pergamon Press, England(Dec. 2002).

Bentz, H., et al., "Isolation and Partial Characterization of a New Human Collagen With an Extended Triple-helical Structural Domain," Proceedings of the National Academy of Sciences of the United States of America, 80(11):3168-3172, National Academy of Sciences, United States, (Jun. 1983).

Benya, P.D and Padilla, S.R, "Isolation and Characterization of Type VIII Collagen Synthesized by Cultured Rabbit Corneal Endothelial Cells," The Journal of Biological Chemistry, 261(9):4160-4169, American Society for Biochemistry and Molecular Biology, United States, (Mar. 1986).

Berger, P.H., et al., "Expression in Transgenic Plants of a Viral Gene Product That Mediates Insect Transmission of Potyviruses," Proceedings of the National Academy of Sciences of the United States of America, 86(21):8402-8406, National Academy of Sciences, United States, (Nov. 1989).

Bevan, M, "The Structure and Transcription Start Site of a Major Potato Tuber Protein Gene," Nucleic Acids Research, 14(11):4625-4638, Information Retrieval ltd, England, (Jun. 1986).

Bhat, Z.F and Bhat, H., "Animal-free Meat Biofabrication," American Journal of Food Technology, 6(6):441-459, (Jun. 2011).

Bhat, Z.F and Bhat, H., "Tissue Engineered Meat-Future Meat," Journal of Stored Products and Postharvest Research, 2(1):1-10, (Jan. 2011).

Bian, W. and Bursac, N.,, "Engineered Skeletal Muscle Tissue Networks With Controllable Architecture," Biomaterials, 30(7):1401-1412, IPC Science and Technology Press, Netherlands, (Mar. 2009).

Bitter, G.A, "Heterologous Gene Expression in Yeast," Methods in Enzymology 152:673-684, Academic Press, United States (1987).

Boonen, K.J and Post, M.J., "The Muscle Stem Cell Niche: Regulation of Satellite Cells During Regeneration," Tissue Engineering Part B, 14(4):419-431, Mary Ann Liebert, Inc, United States (Dec. 2008).

Boonen K.J.M., et al., "Essential Environmental Cues From the Satellite Cell Niche: Optimizing Proliferation and Differentiation," American Journal of Physiology-Cell Physiology, 296(6):C1338-C1345, (Jun. 2009).

Bray E.A, "Expression of the β-subunit of β-conglycinin in Seeds of Transgenic Plants," Planta, 172(3):364-370, Springer-Verlag [etc.], Germany, (Nov. 1987).

Brisson, N., et al., "Plant Virus Vectors: Cauliflower Mosaic Virus," Methods for Plant Molecular Biology, 437-446, New York, Academic Press, (1988).

Broglie, R., et al., "Light-regulated Expression of a Pea Ribulose-1, 5-bisphosphate Carboxylase Small Subunit Gene in Transformed Plant Cells," Science 224(4651):838-843, Nature Publishing Group, England (May 1984).

Burgeson, R.E and Nimni, M.E, "Collagen Types: Molecular Structure and Tissue Distribution," Clinical Orthopaedics and Related Research, 282:250-272, Wolters Kluwer, United States, (Sep. 1992).

Byers, P.H, "Preparation of Type III Procollagen and Collagen From Rat Skin," Biochemistry, 13(25):5243-5248, American Chemical Society, United States, (Dec. 1974).

Casas A.M., et al., "Transgenic Sorghum Plants via Micro Projectile Bombardment," Proceedings of the National Academy of Sciences of the United States of America, 90(23):11212-11216, National Academy of Sciences, United States, (Dec. 1993).

Chang, L.C., et al., "Comparative Study of Physical Properties of Water-Blown Rigid Polyurethane Foams Extended With Commercial Soy Flour", Journal of Applied Polymer Science 80:10-19, John Wiley & Sons, Inc (2001).

Chen, Y., et al., "Structure and Properties of Composites Compression-Molded from Polyurethane Prepolymer and Various Soy Products", Industrial & Engineering Chemistry Research, 42(26):6786-6794, American Chemical Society (Dec. 2003).

Christensen A.H., et al., "Maize Polyubiquitin Genes: Structure, Thermal Perturbation of Expression and Transcript Splicing, and Promoter Activity Following Transfer to Protoplasts by Electroporation," Plant Molecular Biology, 18(4):675-689, (Feb. 1992).

Christou, P., et al. , "The Development of a Variety-independent Gene-transfer Method for Rice," Trends in Biotechnology, 10:239-246, Elsevier Inc., (Jul. 1992).

Chua, J., "Grow Your Own Microbial 'Leather' in Your Kitchen (DIY Tutorial)", Ecouterre, Feb. 23, 2015, [online] , [Retrieved on Sep. 1, 2017], Retrieved from the Internet (URL: www.ecouterre.com/grow-your-own-microbial-leatherin your-kitchen-diy-tutorial).

Co-Pending U.S. Appl. No. 16/724,689, filed Dec. 12, 2019, inventors Lee; S., et al., (Unpublished).

Co-Pending U.S. Appl. No. 16/898,225, filed Jun. 10, 2020, inventors Marga, F.S., et al., (Unpublished).

Cornejo, M.J., et al., "Activity of a Maize Ubiquitin Promoter in Transgenic Rice," Plant Molecular Biology, 23(3):567-581, Kluwer Academic, Netherlands, (Nov. 1993).

Coruzzi, G., et al., "Tissue-specific and Light-regulated Expression of a Pea Nuclear Gene Encoding the Small Subunit of Ribulose-1, 5-Bisphosphate Carboxylase," European Molecular Biology Organization 3(8):1671-1679, PMC, United States National Library of Medicine National Institutes of Health, United States (Aug. 1984).

Database WPI, Week 199427, Thomson Scientific, London, GB, 1994-AN 1994-222702.

Datar, I and Betti, M., "Possibilities for an in Vitro Meat Production System," Innovative Food Science and Emerging Technologies, 11(1):13-22, Elsevier Ltd(Jan. 2010).

De-Deyne, P.G., "Formation of Sarcomeres in Developing Myotubes: Role of Mechanical Stretch and Contractile Activation," American Journal of Physiology-Cell Physiology, 279(6):C1801-C1811, (Dec. 2000).

Dennis, R.G and Kosnik, P.E 2nd., "Excitability and Isometric Contractile Properties of Mammalian Skeletal Muscle Constructs Engineered in Vitro," In Vitro Cellular & Developmental Biology, 36(5):327-335, Springer, Germany (May 2000).

(56) References Cited

OTHER PUBLICATIONS

Dennis, R.G., et al., "Excitability and Contractility of Skeletal Muscle Engineered From Primary Cultures and Cell Lines," American Journal of Physiology-Cell Physiology, 280(2):C288-C295, American Physiological Society, United States (Feb. 2001).

Duance, V.C., et al., "Isolation and Characterization of the Precursor of Type M Collagen," Biochemical Journal, 221(3):885-889, Published by Portland Press on behalf of the Biochemical Society, England, (Aug. 1984).

Dublet, B., et al., "The Structure of Avian Type XII Collagen," Journal of Biological Chemistry, 264(22):13150-13156, American Society for Biochemistry and Molecular Biology, United States, (Aug. 1989).

Edelman, E.R. , "Vascular Tissue Engineering: Designer Arteries," Circulation Research 85(12):1115-1117, Lippincott Williams & Wilkins, United States (Dec. 1999).

Edelman, P.D., et al., "Commentary: in Vitro-cultured Meat Production," Tissue Engineering, 11(5-6):659-662, Mary Ann Liebert, Inc, United States (May-Jun. 2005).

Elstow, S.F. and Weiss, J.B, "Extraction, Isolation and Characterization of Neutral Salt Soluble Type V Collagen From Fetal Calf Skin," Collagen and Related Research, 3(3):181-193, Gustav Fischer Verlag, Germany, (May 1983).

Engler, A. J., et al., "Myotubes Differentiate Optimally on Substrates With Tissue-like Stiffness: Pathological Implications for Soft or Stiff Microenvironments," Journal of Cell Biology, 166(6):877-887, Rockefeller University Press, United States (Sep. 2004).

Extended European Search Report dated Jul. 18, 2017 for corresponding EP Patent Application No. 17156365.3, dated Feb. 15, 2017.

Fonseca, S., et al., "Slow Fiber Cluster Pattern in Pig Longissimus Thoracic Muscle: Implications for Myogenesis," Journal of Animal Science, 81(4):973-983, American Society of Animal Science, United States (Apr. 2003).

Foucher, A.E., et al., "Purification and Characterization of Native Type XIV Collagen," The Journal of Biological Chemistry, 267(22):15759-15764, American Society for Biochemistry and Molecular Biology, United States, (Aug. 1992).

Fromm, M.E., et al., "Inheritance and Expression of Chimeric Genes in the Progeny of Transgenic Maize Plants," Bio/technology (Nature Publishing Company), 8(9):833-839, Nature Publishing Company, [c1983]-1996, United States, (Sep. 1990).

Future Trends in the World Leather Products Industry and Trade, United Nation Industrial Development Organization, Vienna, 2010.

Gawlitta, D., et al., "The Influence of Serum-free Culture Conditions on Skeletal Muscle Differentiation in a Tissue-engineered Model," Tissue Engineering Part A, 14(1):161-171, (Jan. 2008).

Gordon, et al., "Discovery of a New Collagen, Type XX, Present in Chick Cornea," Investigative Ophthalmology & Visual Science, 39(4):S1128, (Mar. 1998), (Abstract only).

Gordon, et al., "Type XX Collagen, a New Member of the Fibril-Associated (FACIT) Family of Collagens," The FASEB Journal, 13(5):A1119, (Mar. 1999).

Gurley, W.B., et al., "Upstream Sequences Required for Efficient Expression of a Soybean Heat Shock Gene," Molecular and Cellular Biology 6(2):559-565, American Society for Microbiology, United States (Feb. 1986).

Halim, A,S., et al., "Biologic and Synthetic Skin Substitutes: An Overview," Indian Journal of Plastic Surgery 43(Suppl): S23—S28, Thieme, Germany (Sep. 2010).

Harris, J.R., et al., "In Vitro Fibrillogenesis of Collagen Type I in Varying Ionic and Ph Conditions," Micron, 49:60-68, Pergamon Press, c1993 , England, (Jun. 2013).

Hinchee, M.A.W., et al., "Production of Transgenic Soybean Plants Using Agrobacterium-mediated DNA Transfer," Bio/Technology, 6:915-922, (Aug. 1988).

Hopkins, P.D and Dacey, A., A vegetarian meat: could technology save animals and satisfy meat eaters?, Journal of Agricultural and Environmental Ethics, 21(6):579-596, Springer, 2008, retrieved from the internet on Jun. 2, 2015 (http://foodethics.univie.ac.at/fileadmin/user.sub.-- upload/inst.sub.--et-hik.sub.--wiss.sub.--dialog/Hopkins.sub.--P..sub.--2008.sub.--Veg.sub.--Me- at.sub.--and.sub.--In.sub.--Meat.pdf).

Huafeng, T., et al., "Improved Flexibility and Water Resistance of Soy Protein Thermoplastics Containing Waterborne Polyurethane," Industrial Crops and Products 32(1):13-20, Elsevier B.V, (Jul. 2010).

Huebner, K., et al., "Chromosomal Assignment of a Gene Encoding a New Collagen Type (col. 15a1) to 9q21-7 Q22," Genomics, 14(2):220-224, Academic Press, [c1987, United States, (Oct. 1992).

Inoguchi, K, "The mRNA for Alpha 1(Xix) Collagen Chain, a New Member of Facits, Contains a Long Unusual 3' Untranslated Region and Displays Many Unique Splicing Variants.," Journal of Biochemistry, 117(1):137-146, Oxford University Press, England, (Jan. 1995).

Inouye, S., et al., "Up-Promoter Mutations in the Ipp Gene of *Escherichia coli*," Nucleic Acids Research 13(9):3101-3110, Oxford University Press, England (1985).

Czlonka, S., et al., "Rigid Polyurethane Foams Reinforced With Industrial Potato Protein", Polymer Testing 68 (2018), 52 pages.

Hum, H and Boccaccini., "Collagen as Coating Material for 45S5 Bioactive Glass-Based Scaffolds for Bone Tissue Engineering," International Journal of Molecular Sciences, 19(6):1807, Switzerland : MDPI (Jun. 2018).

Wang, Y., et al., "Preparation of Soy-Based Adhesive Enhanced by Waterborne Polyurethane: Optimization by Response Surface Methodology", Advances in Materials Science and Engineering, 2018:8, Article ID 9253670 Hindawi (2018).

Xu, N., et al., "Modification of Pa/pu Superfine Non-woven Fiber for "breath" Property Using Collagen and Vegetable Tannins," Journal of Industrial Textiles, ePub 25, 48(10):1593-1615; Abstract; p. 1595-1597; p. 1600, Sage Publishing (Oct. 2018).

Xu, Y., et al., "Improve the Performance of Soy Protein-Based Adhesives by a Polyurethane Elastomer", Polymers 10(9):1016, MDPI, Switzerland (Sep. 2018).

Jakab, K., et al., "Engineering Biological Structures of Prescribed Shape Using Self-assembling Multicellular Systems," Proceedings of the National Academy of Sciences of the United States of America 101(9):2864-2869, National Academy of Sciences, United States (Mar. 2004).

Jakab, K., et al., "Tissue Engineering by Self-assembly and Bioprinting of Living Cells," Biofabrication 2(2):022001, IOP Publishing, England (Jun. 2010).

Jenkins, C.L., et al., "Effect of 3-hydroxyproline Residues on Collagen Stability," Journal of the American Chemical Society, 125(21):6422-6427, American Chemical Society, United States, (May 2003).

Juvonen, M., et al., "Patterns of Expression of the Six Alternatively Spliced Exons Affecting the Structures of the COL 1 and NC2 Domains of the a1 (XIII) Collagen Chain in Human Tissues and Cell Lines," The Journal of Biological Chemistry, 267 (34):24700-24707, (Dec. 1992).

Kapoor, R, "Type VIII Collagen From Bovine Descemet's Membrane: Structural Characterization of a Triple-helical Domain," Biochemistry, 25(13):3930-3937, American Chemical Society, United States, (Jul. 1986).

Katsumata, M., "Promotion of Intramuscular Fat Accumulation in Porcine Muscle by Nutritional Regulation," Animal Science Journal, 82(1):17-25, Wiley, Australia(Feb. 2011).

Kay, R., et al., "Duplication of Camv 35S Promoter Sequences Creates a Strong Enhancer for Plant Genes," Science, 236(4806):1299-1302, American Association for the Advancement of Science, United States, (Jun. 1987).

Kielty, C.M., et al., "Isolation and Ultrastructural Analysis of Microfibrillar Structures From Foetal Bovine Elastic Tissues," Journal of cell science, 99(4):797-807, Company of Biologists, England, (Aug. 1991).

Kielty, C.M., et al, "The Collagen Family: Structure, Assembly and Organization in the Extracellular Matrix," Connective Tissue and Its Heritable Disorders: Molecular, Genetic, and Medical Aspects, 159-221, (2002).

Kivirikko, S., et al., "Primary Structure of the Alpha 1 Chain of Human Type Xv Collagen and Exon-intron Organization in the 3'

(56) References Cited

OTHER PUBLICATIONS

Region of the Corresponding Gene," The Journal of biological chemistry, 269(7):4773-4779, American Society for Biochemistry and Molecular Biology, (Feb. 1994).
Klemm, D., et al., "Cellulose: Fascinating Biopolymer and Sustainable Raw Material," Angewandte Chemie International Edition, 44(22):3358-3393, (May 2005).
Kosnik, P.E., et al.,"Tissue Engineering Skeletal Muscle," Functional Tissue Engineering, 377-392, Springer-Verlag, United States, (2003).
Langelaan M.L.P., et al. "Meet the New Meat: Tissue Engineered Skeletal Muscle," Trends in Food Science & Technology, 21(2):59-66, Elsevier, (Feb. 2010).
Langer, R. and Vacanti, J.P.,, "Tissue Engineering; Science," Science, 260(5110):920-926, American Association for the Advancement of Science, (May 1993).
Lanza., et al., "Principles of Tissue Engineering; 3rd. Ed.; Chapter 12 Principles of Tissue Culture and Bioreactor Design (III. Principles of Bioreactor Design)," Academic Press, 165-166, (Aug. 2007).
Lee, N., et al., "Efficient Transformation and Regeneration of Rice Small Cell Groups," Proceedings of the National Academy of Sciences of the United States of America, 88(15):6389-6393, National Academy of Sciences, United States, (Aug. 1991).
Lee, W., et al., "Multi-layered Culture of Human Skin Fibroblasts and Keratinocytes Through Three-dimensional Freeform Fabrication," Biomaterials 30(8):1587-1595, Elsevier Science, Netherlands (Mar. 2009).
Levenberg, S., et al., "Engineering Vascularized Skeletal Muscle Tissue," Nature Biotechnology, 23(7):879-884, Nature America Publishing, United States (Jul. 2005).
Li, K., et al., "Cloning of Type XVII Collagen," The Journal of biological chemistry, 268(12):8825-8834, American Society for Biochemistry and Molecular Biology, United States, (Apr. 1993).
Li, M., et al., "Electrospun Protein Fibers as Matrices for Tissue Engineering," Biomaterials, 26(30):5999-6008, IPC Science and Technology Press, Netherlands, (Oct. 2005).
Li, M., et al., "Soy Protein-Modified Waterborne Polyurethane Biocomposites With Improved Functionality", RSC advances, 6(16):12837-12849, Royal Society of Chemistry (2016).
Lin, Y., et al., "Physical, Mechanical, and Thermal Properties of Water-Blown Rigid Polyurethane Foam Containing Soy Protein Isolate", Cereal Chemistry 73(2):189-196, American Association of Cereal Chemists, Inc (1996).
Lin, Y., et al., "Water-Blown Flexible Polyurethane Foam Extended with Biomass Materials", Journal of Applied Polymer Science 65(4):695-703, John Wiley & Sons, Inc (Jul. 1997).
Liu, D., et al., "Structure and Properties of Blend Films Prepared from Castor Oil-Based Polyurethane/Soy Protein Derivative", Industrial & Engineering Chemistry Research 47(23):9330-9336, American Chemical Society (2008).
Liu, H., et al., "Soy-Oil-Based Waterborne Polyurethane Improved Wet Strength of Soy Protein Adhesives on Wood", International Journal of Adhesion and Adhesives, 73:66-74, Elsevier Ltd, (Mar. 2017).
Logan, J., et al., "Adenovirus Tripartite Leader Sequence Enhances Translation of mRNAs Late After Infection," Proceedings of the National Academy of Sciences USA 81(12):3655-3659, National Academy of Sciences, United States (Jun. 1984).
Lucklow, V.A., et al., "High Level Expression of Nonfused Foreign Genes With Autographa Californica Nuclear Polyhedrosis Virus Expression Vectors," Virology 170(1):31-39 (May 1989).
Lunstrum, G.P., et al., "Identification and Partial Purification of a Large, Variant Form of Type XII Collagen," The Journal of biological chemistry, 267(28):20087-20092, American Society for Biochemistry and Molecular Biology, United States, (Oct. 1992).
Lunstrum, G.P., et al., "Large Complex Globular Domains of Type Vii Procollagen Contribute to the Structure of Anchoring Fibrils," The Journal of biological chemistry, 261(19):9042-9048, American Society for Biochemistry and Molecular Biology, United States, (Jul. 1986).
Mackett, M., et al., "General Method for Production and Selection of Infectious Vaccinia Virus Recombinants Expressing Foreign Genes," Journal of Virology 49(3):857-864, American Society for Microbiology, United States (Mar. 1984).
Mackett, M., et al., "Vaccinia Virus: A Selectable Eukaryotic Cloning and Expression Vector," Proceedings of the National Academy of Sciences USA 79(23):7415-7419, National Academy of Sciences, United States (Dec. 1982).
Madbouly, S.A and Lendlein, A., "Degradable Polyurethane/Soy Protein Shape-Memory Polymer Blends Prepared Via Environmentally-Friendly Aqueous Dispersions," Macromolecular Materials and Engineering 297(12):1213-1224, Wiley-VCH Verlag GmbH & Co. KGaA, Weinheim (Nov. 2012).
Marga. F., et al., "Developmental Biology and Tissue Engineering," Birth Defects Research Part C: Embryo Today 81(4):320-328, Wiley Periodicals, Inc, United States (Dec. 2007).
Marga. F., et al., "Toward Engineering Functional Organ Modules by Additive Manufacturing," Biofabrication 4(2):022001, IOP Publishing, England (Jun. 2012).
Matsuda, N., et al. "Tissue Engineering Based on Cell Sheet Technology," Advanced Materials, 19(20):3089-3099, John Wiley & Sons, (Oct. 2007).
McElroy, D., et al., "Isolation of an Efficient Actin Promoter for Use in Rice Transformation," The Plant cell, 2(2):163-171, American Society of Plant Physiologists, c1989, United States, (Feb. 1990).
McGrath, J.A., et al., "Mutations in the 180-kd Bullous Pemphigoid Antigen (Bpag2), a Hemidesmosomal Transmembrane Collagen (Col 17a1), in Generalized Atrophic Benign Epidermolysis Bullosa," Nature genetics, 11(1):83-86, Nature Pub. Co., c1992, United States, (Sep. 1995).
Mead, P.S., et al. "Food-related Illness and Death in the United States," Emerging infectious diseases, 5(5):607-625, National Center for Infectious Diseases, Centers for Disease Control and Prevention (CDC), United States, (Sep. 1999).
Medberry, S.L., et al., "The Commelina Yellow Mottle Virus Promoter is a Strong Promoter in Vascular and Reproductive Tissues," The Plant cell, 4(2):185-192, American Society of Plant Physiologists, c1989, United States, (Feb. 1992).
Meyer, M., et al., "Collagen Fibres by Theromoplastic and Wet Spinning," Materials Science and Engineering C, 30(8):1266-1271, ResearchGate , (Oct. 2010).
Miller, E.J. and Rhodes, R.K, "[2] Preparation and Characterization of the Different Types of Collagen," Methods in enzymology, 82(A):33-64, Academic Press, United States, (1982).
Mironov., et al., "Biofabrication: a 21st century manufacturing paradigm" Biofabrication 1 (2009) pp. 1-16.
Mironov, V., et al., "Bioprinting Living Structures," Journal of Materials Chemistry 17(20):2054-2060 (May 2007).
Munarin, F., et al. "Pectin-based Injectable Biomaterials for Bone Tissue Engineering," Biomacromolecules, 12(3):568-577, American Chemical Society, United States, (Mar. 2011), (Abstract Only).
Muragaki. Y., et al., "The Human Alpha 1(Xv) Collagen Chain Contains a Large Amino-terminal Non-triple Helical Domain With a Tandem Repeat Structure and Homology to Alpha 1(Xviii) Collagen," The Journal of biological chemistry, 269(6):4042-4046, American Society for Biochemistry and Molecular Biology, United States, (Feb. 1994).
Myers, J.C., et al., "Identification of a Previously Unknown Human Collagen Chain, Alpha 1(Xv), Characterized by Extensive Interruptions in the Triple-helical Region," Proceedings of the National Academy of Sciences of the United States of America, 89(21):10144-10148, National Academy of Sciences, United States, (Nov. 1992).
Myers, J.C., et al., "The Triple-helical Region of Human Type Xix Collagen Consists of Multiple Collagenous Subdomains and Exhibits Limited Sequence Homology to Alpha 1(XVI)," The Journal of biological chemistry, 269(28):18549-18557, American Society for Biochemistry and Molecular Biology, United States, (Jul. 1994).
Niklason, L.E., et al., "Advances in Tissue Engineering of Blood Vessels and Other Tissues," Transplant Immunology 5(4):303-306, Elsevier, Netherlands (Dec. 1997 ).

(56) References Cited

OTHER PUBLICATIONS

Norotte, C., et al., "Scaffold-free Vascular Tissue Engineering Using Bioprinting," Biomaterials 30(30):5910-5917, Elsevier Science, Netherlands (Oct. 2009).
Oh, S.P., et al., "Cloning of Cdna and Genomic Dna Encoding Human Type XVIII Collagen and Localization of the Alpha 1(XVIII) Collagen Gene to Mouse Chromosome 10 and Human Chromosome 21," Genomics, 19(3):494-499, Academic Press, [c1987, United States, (Feb. 1994).
Oh, S.P., et al., "Isolation and Sequencing of cDNAs for Proteins With Multiple Domains of Gly-xaa-yaa Repeats Identify a Distinct Family of Collagenous Proteins," Proceedings of the National Academy of Sciences of the United States of America, 91(10):4229-4233, National Academy of Sciences, United States, (May 1994).
Olkkonen, V.M., et al., "Expression of Exogenous Proteins in Mammalian Cells With the Semliki Forest Virus Vector," Methods in cell biology, 43(A):43-53, Academic Press, United States, (1994).
Pan, T.C., et al., "Cloning and Chromosomal Location of Human Alpha 1(XVI) Collagen," Proceedings of the National Academy of Sciences of the United States of America, 89(14):6565-6569, National Academy of Sciences, United States, (Jul. 1992).
Panicali, D., et al., "Construction of Poxviruses as Cloning Vectors: Insertion of the Thymidine Kinase Gene from Herpes Simplex Virus into the DNA of Infectious Vaccinia Virus," Proceedings of the National Academy of Sciences USA 79(16):4927-4931, The National Academy of Sciences of the United States (Aug. 1982).
Park, H., et al. "Effects of Electrical Stimulation in C2C12 Muscle Constructs," Journal of tissue engineering and regenerative medicine, 2(5):279-287, John Wiley & Sons, England, (Jul. 2008).
Park, S.K and Hettiarachchy, N.S., "Physical and Mechanical Properties of Soy Protein-Based Plastic Foams", Journal of the American Oil Chemists, Society 76(10):1201-1205, AOCS Press (1999).
Paszkowski, J., et al., "Direct Gene Transfer to Plants," The EMBO journal, 3(12):2717-2722, Wiley Blackwell, England, (Dec. 1984).
Pedersen, K., et al., "Cloning and Sequence Analysis Reveal Structural Variation Among Related Zein Genes in Maize," Cell, 29(3):1015-1026, Cell Press, United States, (Jul. 1982).
Perera, G., et al. "Hydrophobic Thiolation of Pectin With 4-aminothiophenol: Synthesis and in Vitro Characterization," American Association of Pharmaceutical Scientists, 11(1):174-180, American Association of Pharmaceutical Scientists, United States, (Mar. 2010).
Perez-Pomares, J.M., et al., "Tissue Fusion and Cell Sorting in Embryonic Development and Disease: Biomedical Implications," Bioessays 28(8):809-821, Wiley, United States (Aug. 2006 ).
Pette D., et al., "What Does Chronic Electrical Stimulation Teach Us About Muscle Plasticity?," Muscle & Nerve, 22(6):666-677, John Wiley & Sons, United States (Jun. 1999).
Prockop, D.J. and Kivirikko, K.I, "Collagens: Molecular Biology, Diseases, and Potentials for Therapy," Annual review of biochemistry, 64:403-434, Annual Reviews, United States, (1995).
Rehn, M. and Pihlajaniemi, T, "Alpha 1(XVIII), a Collagen Chain With Frequent Interruptions in the Collagenous Sequence, a Distinct Tissue Distribution, and Homology With Type XV Collagen," Proceedings of the National Academy of Sciences of the United States of America, 91(10):4234-4238, National Academy of Sciences, United States, (May 1994).
Rehn, M., et al., "Primary Structure of the Alpha 1 Chain of Mouse Type XVIII Collagen, Partial Structure of the Corresponding Gene, and Comparison of the Alpha 1(Xviii) Chain With Its Homologue, the Alpha 1(Xv) Collagen Chain," The Journal of biological chemistry, 269(19):13929-13935, American Society for Biochemistry and Molecular Biology, United States, (May 1994).
Riggs, C.D. and Bates, G.W, "Stable Transformation of Tobacco by Electroporation: Evidence for Plasmid Concatenation," Proceedings of the National Academy of Sciences of the United States of America, 83(15):5602-5606, National Academy of Sciences, United States, (Aug. 1986).
Rober, M.B.T., et al., "One of Two Different ADP-glucose Pyrophosphorylase Genes From Potato Responds Strongly to Elevated Levels of Sucrose," Molecular & general genetics, 224(1):136-146, New York Springer-Verlag [1967, Germany, (Oct. 1990).
Rogers, J.C.,, "Two Barley Alpha-amylase Gene Families Are Regulated Differently in Aleurone Cells," The Journal of biological chemistry, 260(6):3731-3738, American Society for Biochemistry and Molecular Biology, United States, (Mar. 1985).
Rogers, S.G., et al., "Improved Vectors for Plant Transformation: Expression Cassette Vectors and New Selectable Markers," Methods in Enzymology, 153:253-277, Elsevier Inc, (1987).
Ruther, U. and Muller-Hill, B., "Easy Identification of cDNA Clones," The EMBO Journal 2(10):1791-1794, IRL Press Ltd, England (1983).
Sanger, M., et al., "Characteristics of a Strong Promoter From Figwort Mosaic Virus: Comparison With the Analogous 35s Promoter From Cauliflower Mosaic Virus and the Regulated Mannopine Synthase Promoter," Plant molecular biology, 14(3):433-443, Martinus Nijhoff/Dr. W. Junk, 1981, Netherlands, (Mar. 1990).
Savadogo, P., et al. "Effects of Grazing Intensity and Prescribed Fire on Soil Physical and Hydrological Properties and Pasture Yield in the Savanna Woodlands of Burkina Faso," Agriculture, Ecosystems & Environment, 118(1-4):80-92, Elsevier B.V., (Jan. 2007).
Schardl, C.L., et al., "Design and Construction of a Versatile System for the Expression of Foreign Genes in Plants," Gene, 61(1):1-11, Elsevier/North-Holland, 1976, Netherlands, (1987).
Schmitt, F.O., et al., "Electron Microscope Investigations of the Structure of Collagen," Journal of Cellular Physiology, 20(1):11-33, (Aug. 1942).
Sekine, H., et al., "Myocardial Tissue Reconstruction: the Cell Sheet Engineering Approach," Inflammation and Regeneration, 27 (3):171-176, (May 2007).
Shayegan, M. and Forde, N.F.,, "Microrheological Characterization of Collagen Systems: From Molecular Solutions to Fibrillar Gels," PloS one, 8(8):1-12, Public Library of Science, United States, (Aug. 2013).
Shepherd, J.H., et al., "Effect of Fiber Crosslinking on Collagen-fiber Reinforced Collagen-chondroitin-6-sulfate Materials for Regenerating Load-bearing Soft Tissues," Journal of biomedical materials research. Part A, 101(1):176-184, John Wiley & Sons, United States, (Jan. 2013).
Smith, C.M., et al., "Three-dimensional Bioassembly Tool for Generating Viable Tissue-engineered Constructs," Tissue Engineering 10(9-10):1566-1576, Mary Ann Liebert, Inc, United States (Sep.-Oct. 2004).
Smith, G.E., et al., "Molecular Engineering of the Autographa Californica Nuclear Polyhedrosis Virus Genome: Deletion Mutations Within the Polyhedrin Gene," Journal of virology, 46(2):584-593, American Society for Microbiology, United States, (May 1983).
Native collagen, bovine dermis, Retrieved on Oct. 13, 2018], Retrieved from the Internet (https://www.cosmobio.com/products/kou_iac50_50.html).
Sommer, F., et al., "Ascorbic Acid Modulates Proliferation and Extracellular Matrix Accumulation of Hyalocytes," Tissue engineering, 13(6):1281-1289, Mary Ann Liebert, Inc., United States, (Jun. 2007) abstract only.
Suganya, S., et al., "Naturally Derived Biofunctional Nanofibrous Scaffold for Skin Tissue Regeneration," International Journal of Biological Macromolecules 68:135-143, Elsevier, Netherlands (Jul. 2014).
Takamatsu, N., et al., "Expression of Bacterial Chloramphenicol Acetyltransferase Gene in Tobacco Plants Mediated by TMV-RNA," European Molecular Biology Organization Journal 6(2):307-311, IRL Press Limited, Oxford, England, (Feb. 1987).
Teja, A.S and Koh, P.Y, "Synthesis, Properties, and Applications of Magnetic Iron Oxide Nanoparticles," Progress in Crystal Growth and Characterization of Materials, 55(1-2):22-45, (Mar.-Jun. 2009).
Thelen, M.H., et al., "Electrical Stimulation of C2C12 Myotubes Induces Contractions and Represses Thyroid Hormone-Dependent Transcription of the Fast-type Sarcoplasmic-reticulum Ca2+-ATPase Gene," The Biochemical journal, 321(Pt 3):845-848, Published by Portland Press on behalf of the Biochemical Society, England, (Feb. 1997).

(56) References Cited

OTHER PUBLICATIONS

Thibault, J.F., and Rinaudo, M., , "Chain Association of Pectic Molecules During Calcium-induced Gelation," Biopolymers, 25(3):455-468, John Wiley & Sons, (Mar. 1986).
Tian, H., et al., "Polyether Polyol-Based Rigid Polyurethane Foams Reinforced With Soy Protein Fillers", Journal of Vinyl & Additive Technology 24(S1): E105-E111, Society of Plastics Engineers (2017).
Tong, X., et al., "Development of Blend Films From Soy Meal Protein and Crudeglycerol-Based Waterborne Polyurethane", Industrial Crops and Products 67:11-17, Elsevier B.V (May 2015).
Tuomisto H.L. et al., "Environmental Impacts of Cultured Meat Production," Environmental Science & Technology, 45(14):6117-6123, American Chemical Society, (Jun. 2011).
Van Heeke, G., et al., "Expression of Human Asparagine Synthetase in *Escherichia coli*," The Journal of Biological Chemistry 264(10):5503-5509, American Society for Biochemistry and Molecular Biology, United States (Apr. 1989).
Wan, Y and Lemaux, P.G.,, "Generation of Large Numbers of Independently Transformed Fertile Barley Plants," Plant physiology, 104(1):37-48, American Society of Plant Biologists, United States, (Jan. 1994).
Wang, G and Zhou, A., "Soy Protein Based Biodegradable Flexible Polyurethane Foam", Advanced Materials Research, 152-153:1862-1865, Trans Tech Publications, Switzerland (2011).
Wang, N and Zhang, L., "Preparation and Characterization of Soy Protein Plastics Plasticized With Waterborne Polyurethane, "Polymer International 54(1):233-239, Society of Chemical Industry, (Jan. 2005).
Wang, N., et al., "Mechanical Properties and Biodegradability of Crosslinked Soy Protein Isolate/Waterborne Polyurethane Composites", Journal of Applied Polymer Science 95:465-473, Wiley Periodicals, Inc (2005).
Wang, Y., et al., "Properties of Soy-Based Wood Adhesives Enhanced by Waterborne Polyurethane Modification", Journal of Biobased Materials and Bioenergy 11:330-335, American Scientific Publishers (2017).
Watt, S.L., et al., "Characterization of Collagen Types Xii and XIV From Fetal Bovine Cartilage," The Journal of biological chemistry, 267(28):20093-20099, American Society for Biochemistry and Molecular Biology, United States, (Oct. 1992).
Wells, H.C., et al., "Collagen Fibril Diameter and Leather Strength," Journal of agricultural and food chemistry, 61(47):11524-11531, American Chemical Society, United States, (Nov. 2013).
Wu, B., et al., "The New Development of Modified Collagen Protein Spinning," Leather Science and Engineering 17(4):27-31, China Academic Journal Electronic Publishing House (Aug. 2007).
Wu, J.J., et al., "Type VI Collagen of the Intervertebral Disc," The Biochemical journal, 248(2):373-381, Published by Portland Press on behalf of the Biochemical Society, England, (Dec. 1987).
Wu, S., et al., "Quantitative Analysis on Collagen Morphology in Aging Skin Based on Multiphoton Microscopy," Journal of biomedical optics, 16(4):40502, SPIE—the International Society for Optical Engineering in cooperation with International Biomedical Optics Society, c1996, (Apr. 2011).
Wu, Y., et al. "Fiber Formation by Dehydration-induced Aggregation of Albumin," Journal of Applied Polymer Science, 129(6):3591-3600, Wiley Periodicals, (Sep. 2013).
Xie, D.Y., et al., "Roles of Soft Segment Length in Structure and Property of Soy Protein Isolate/Waterborne Polyurethane Blend Films", Journal of Industrial and Engineering Chemistry Research 55(5):1229-1235, American Chemical Society (Jan. 2016).
Yamaguchi, N., et al., "Molecular Cloning and Partial Characterization of a Novel Collagen Chain, Alpha 1(XVI), Consisting of Repetitive Collagenous Domains and Cysteine-containing Non-collagenous Segments," Journal of biochemistry, 112(6):856-863, Oxford University Press, England, (Dec. 1992).
Yang, J. et al., "Cell Sheet Engineering: Recreating Tissues Without Biodegradable Scaffolds," Biomaterials, 26(33):6415-6422, Elsevier Science, Netherlands, (Nov. 2005).
Yin, Y. and Beachy, R.N, "The Regulatory Regions of the Rice Tungro Bacilliform Virus Promoter and Interacting Nuclear Factors in Rice (*Oryza sativa* L.)," The Plant journal : for cell and molecular biology, 7(6):969-980, Blackwell Scientific Publishers and BIOS Scientific Publishers in association with the Society for Experimental Biology, c1991, England, (Jun. 1995).
Yoshioka et al., "Synteny between the Loci for a Novel FACIT-like Collagen Locus (D6S228E) and al (IX) Collagen (COL9A1) on 6q12-q14 in Humans," Genomics, 13(3):884-886, Academic Press, United States (Jul. 1992).
Zhang, M., et al., "Development of Soy Protein Isolate/waterborne Polyurethane Blend Films With Improved Properties", Colloids and Surfaces B: Biointerfaces 100:16-21, Elsevier B.V, Netherlands (Dec. 2012).
Zhang, S., et al., "Water-Blown Castor Oil-Based Polyurethane Foams with Soy Protein as a Reactive Reinforcing Filler", Journal of Polymers and the Environment 26:15-22, Springer (2018).
Zhao, S., et al., "Preparation and Demonstration of Poly(Dopamine)-Triggered Attapulgite-Anchored Polyurethane as a High-performance Rod-Like Elastomer to Reinforce Soy Protein-Isolated Composites", Applied Surface Science, 442:537-546, ScienceDirect, Elsevier (Jun. 2018).
UniProt Submission CO3A1_HUMAN. Collagen alpha-1(III) chain (Dec. 5, 2018) [Retrieved from the Internet Apr. 13, 2020:(https://www.uniprot.org/uniprot/P02461.txt?version=212).
Mandal, B, and Majumdar, S.G.,"Nutritional Evaluation of Proteins from three Non-Traditional Seeds with or without Amino Acids Supplementation in Albino Rats," Proceedings of the Indian National Science Academy B50 No. 1:48-56, Nutritional Evaluation of Non-traditional Seed Proteins, Biochemistry Department, Burdwan Medical College, Burdwan (1984).
Rahman, M.M and Netravali, A.N., "Green Resinfrom Forestry Waste Residue "Karanja (Pongamia pinnata) Seed Cake" for BiobasedComposite Structures," ACS Sustainable Chemistry & Engineering 2(10):2318-2328, American Chemical Society (Oct. 2014).
Ren, X., et al., "Engineering ZonalCartilage Through Bioprinting Collagen Type II Hydrogel Constructs WithBiomimetic Chondrocyte Density Gradient, " Bmc Musculoskeletal Disorders17: 301, BioMed Central, England (2016).
Koide, T., "Application of Collagen-like Triple-helical Peptides to Biochemical Studies Elucidating the Collagen Structure and Functions," Seikagaku. The Journal of Japanese Biochemical Society 82(6):474-483, Nippon Seikagakkai, Japan (Jun. 2010).
Langrock, T., et al., "Analysis of Hydroxyproline Isomers and Hydroxylysine by Reversed-Phase HPLC and Mass Spectrometry," Journal of Chromatography B 847(2):282-288, Elsevier, Netherlands (Mar. 2007).
Li, Z., et al., "Mechanical Behaviour of Natural Cow Leather in Tension," Acta Mechanica Solida Sinica 22(1):37-44, AMSS Press, China (2009).

* cited by examiner

BIOFABRICATED LEATHER ARTICLES HAVING ZONAL PROPERTIES

FIELD OF THE INVENTION

The invention herein provides biofabricated leather materials having zonal properties.

BACKGROUND OF THE INVENTION

Leather and leather like materials are used to make shirts, pants, dresses, skirts, coats, blouses, t-shirts, sweaters, shoes, bags, furniture, blankets, curtains, wall coverings, table cloths, car seats and interiors, and the like. A new biofabricated leather material is taught in co-pending U.S. patent application Ser. No. 15/433,566, the content of which is hereby incorporated by reference. The biofabricated collagen solution utilized in that disclosure is well suited for making materials in various shapes and designs as well as for bonding materials together. Other biofabricated leather materials are taught in co-pending U.S. patent application Ser. No. 62/533,950 filed Jul. 18, 2017, the contents of which are incorporated herein by reference.

DESCRIPTION OF RELATED ART

Leather and leather like materials have been used for clothing and footwear for many years. Clothing and footwear may require different properties such as stretchability, tear strength, softness, breathability and the like in different regions of the articles. For example, in athletic footwear it may be useful to have a strong material in the toes and a breathable material in the arch. As used herein, breathable material means air and or water vapor may pass through the material. Breathable materials allow sweat to escape and enable air flow to provide cooling. Breathability can be measured by the known moisture vapor transmission rate test. When different properties are desired within one article, it is common to sew together dissimilar materials. There is a need for a material with different properties in different areas or regions ("zonal properties") to eliminate the need to sew, melt or weld different materials together.

European patent number EP2721941 discloses footwear having zonal properties. The zonal properties are obtained by sewing fabrics with different properties in different regions of the footwear. It is also known to melt or weld a material to join different materials together. Despite the teaching of the reference, there is a continuing need for a material with zonal properties without the need to sew, melt or weld different materials together.

SUMMARY OF THE INVENTION

The present invention provides methods for making a biofabricated material having zonal properties as well as a biofabricated material having zonal properties.

As used herein, the term biofabricated means that microorganisms make a raw material that is isolated and processed into a new material. In order to achieve zonal properties, the biofabricated material may be adhered to dissimilar materials in adjacent zones. In this method it is possible to use dissimilar support materials in two or more zones. A second method of achieving zonal properties is to prepare two or more batches of liquid biofabricated material with varying composition or additives to provide different properties in a final product and the batches may be poured side by side and dried to yield a biofabricated material with zonal properties or may be poured in a patterned (e.g., concentric zones or an embedded design) manner. In this method it is advantageous to permit the poured liquid biofabricated material to flow together so that the two zones adhere directly to each other. In another embodiment, the zonal properties are achieved by varying the composition or additives by layer to layer. For example, the bottom layer may comprise of a material with antifungal properties and the top layer may comprise of a material with anti-abrasion properties.

In a preferred embodiment, the biofabricated material may comprise recombinant bovine collagen.

In an embodiment of the present invention, the liquid biofabricated material may be utilized to also join dissimilar biofabricated materials together. One or more dissimilar biofabricated materials may be placed side by side with opposing edges and a gap between the edges; and a biofabricated material may be poured to fill the gap and overlap the opposing edges then dried to bond the opposing edges of the material.

The material coated by the biofabricated material may be biofabricated leather, a fabric, a wood, a wood veneer, a metal, a plastic or a combination thereof. The fabric may be natural, synthetic or a combination thereof and may be woven, non-woven, a knit or a combination thereof and may have a mesh ranging from 300 threads per square inch to 1 thread per square foot or a pore size greater than or equal to 11 µm in diameter. The fibers of the fabric may comprise protein, cellulose, or a combination thereof. The edges of the fabric may be devoured.

Another embodiment is an article having zonal properties comprising a first material pretreated with a solution and coated with a biofabricated material; and a dissimilar material wherein the materials are bonded together with biofabricated material. The first material may be a cellulose fabric pretreated with a periodate solution and the cellulose fabric may comprise one or more of viscose, acetate, lyocell, bamboo. The periodate pretreatment may include 25% to 100% periodate by weight of the fabric and may be conducted by exposing the fabric to the periodate solution for 15 mins to 24 hours, quenching the periodate with a glycol, e.g., ethylene glycol, propylene glycol, diethylene glycol, dipropylene glycol, triethylene glycol, polyethylene glycol, butylene glycol or a combination thereof, rinsing the fabric with water and drying the fabric. The fabric may be natural, synthetic or a combination thereof and may be woven, non-woven, a knit or a combination thereof and may have a mesh ranging from 300 threads per square inch to 1 thread per square foot or a pore size greater than or equal to 11 µm in diameter. The fibers of the fabric may comprise protein, cellulose, or a combination thereof. The edges of the fabric may be devoured.

The fabric may also be pretreated with a collagen solution such as by applying a 0.5 mg/ml to 10 mg/ml collagen solution to the fabric and/or pouring a collagen solution into a container, cooling the container, mixing the solution, adding a buffer to the solution to induce fibrillation, filtering the solution through the fabric, placing the fabric and the filtrate in the container and mixing.

DETAILED DESCRIPTION OF THE INVENTION

As used herein, the term "zonal properties" refers to an article (e.g., clothing, belt, handbag, etc. as defined herein) which has different zones (e.g., areas or regions) wherein one or more of the zones possesses at least one property that is different than one or more zone adjacent thereto. The properties that may be varied from zone to zone include, but is not limited to, color, breathability, stretchability, tear strength, softness, rigidity, abrasion resistance, heat transfer to enable warming or cooling, electromagnetic, luminescence, reflectance, antimicrobial, antifungal, fragrance and combinations thereof. In a particular advantage of the present invention, the article is imparted with zonal properties without sewing, melting, or welding different materials together. Another advantage of the present invention is that article is imparted with zonal properties without the need for altering the thickness of the leather product by, for example, shaving or for altering the properties by adding further components after the leather product is formed.

The term "collagen" refers to any one of the known collagen types, including collagen types I through XX, as well as to any other collagens, whether natural, synthetic, semi-synthetic, or recombinant. It includes all of the collagens, modified collagens and collagen-like proteins described herein. The term also encompasses procollagens and collagen-like proteins or collagenous proteins comprising the motif (Gly-X-Y)n where n is an integer. It encompasses molecules of collagen and collagen-like proteins, trimers of collagen molecules, fibrils of collagen, and fibers of collagen fibrils. It also refers to chemically, enzymatically or recombinantly-modified collagens or collagen-like molecules that can be fibrillated as well as fragments of collagen, collagen-like molecules and collagenous molecules capable of assembling into a nanofiber.

In some embodiments, amino acid residues, such as lysine and proline, in a collagen or collagen-like protein may lack hydroxylation or may have a lesser or greater degree of hydroxylation than a corresponding natural or unmodified collagen or collagen-like protein. In other embodiments, amino acid residues in a collagen or collagen-like protein may lack glycosylation or may have a lesser or greater degree of glycosylation than a corresponding natural or unmodified collagen or collagen-like protein.

The collagen in a collagen composition may homogenously contain a single type of collagen molecule, such as 100% bovine Type I collagen or 100% Type III bovine collagen, or may contain a mixture of different kinds of collagen molecules or collagen-like molecules, such as a mixture of bovine Type I and Type III molecules. Such mixtures may include >0%, 10, 20, 30, 40, 50, 60, 70, 80, 90, 95, 99 or <100% of the individual collagen or collagen-like protein components. This range includes all intermediate values. For example, a collagen composition may contain 30% Type I collagen and 70% Type III collagen, or may contain 33.3% of Type I collagen, 33.3% of Type II collagen, and 33.3% of Type III collagen, where the percentage of collagen is based on the total mass of collagen in the composition or on the molecular percentages of collagen molecules.

"Collagen fibrils" are nanofibers composed of tropocollagen (triple helices of collagen molecules). Tropocollagens also include tropocollagen-like structures exhibiting triple helical structures. The collagen fibrils of the invention may have diameters ranging from 1 nm and 1 µm. For example, the collagen fibrils of the invention may have an average or individual fibril diameter ranging from 10 to 1000 nm, 20 to 500 nm, or 50 to 100 nm. This range includes all intermediate values and subranges. In some of the embodiments of the invention collagen fibrils will form networks. Collagen fibrils can associate into fibrils exhibiting a banded pattern and these fibrils can associate into larger aggregates of fibrils. In some embodiments the collagen or collagen-like fibrils will have diameters and orientations similar to those in the top grain or surface layer of a bovine or other conventional leather. In other embodiments, the collagen fibrils may have diameters comprising the top grain and those of a corium layer of a conventional leather.

A "collagen fiber" is composed of collagen fibrils that are tightly packed and exhibit a high degree of alignment in the direction of the fiber. It can vary in diameter from 1 µm to 2 mm or from 5 µm to 500 µm. Some embodiments of the network of collage fibrils of the invention do not contain substantial content of collagen fibers having diameters greater than 5 µm. The composition of the grain surface of a leather can differ from its more internal portions, such as the corium which contains coarser fiber bundles.

"Fibrillation" refers to a process of producing collagen fibrils. It may be performed by raising the pH or by adjusting the salt concentration of a collagen solution or suspension. In forming the fibrillated collagen, the collagen may be incubated to form the fibrils for any appropriate length of time, including between 1 min and 24 hrs and all intermediate values. For example, it is envisioned that the minimum time is at least 1 min, at least 5 min, at least 15 min, at least 30 min, at least 1 hr, at least 2 hrs, at least 5 hrs, and at least 7.5 hrs, while the maximum time is at most 24 hrs, at most 18 hrs, at most 15 hrs, at most 12 hrs, and at least 10 hrs, as well as all sub-ranges defined by these values.

The fibrillated collagen described herein may generally be formed in any appropriate shape and/or thickness, including flat sheets, curved shapes/sheets, cylinders, threads, and complex shapes. These sheets and other forms may have virtually any linear dimensions including a thickness, width or length. The thickness may range from 0.1 to 2 mm or from 0.2 to 1 mm. The width may range from 0.5 inch to 10 feet or greater. The length may range from 0.5 inch to 10 feet or greater.

The fibrillated collagen may lack any or any substantial amount of higher order structure. In a preferred embodiment, the collagen fibrils will be unbundled and not form the large collagen fibers found in animal skin and provide a strong and uniform non-anisotropic structure to the biofabricated leather.

In other embodiments, some collagen fibrils can be bundled or aligned into higher order structures. Collagen fibrils in a biofabricated leather may exhibit an orientation index ranging from 0 to 1.0 or from 0.25 to 0.75 or 0.5 wherein an orientation index of 0 describes collagen fibrils that lack alignment with other fibrils and an orientation index of 1.0 describes collagen fibrils that are completely aligned. This range includes all intermediate values and subranges. Those of skill in the art are familiar with the orientation index which is also incorporated by reference to Sizeland, et al., J. Agric. Food Chem. 61: 887-892 (2013) or Basil-Jones, et al., J. Agric. Food Chem. 59: 9972-9979 (2011).

A biofabricated leather like material may be fibrillated and processed to contain collagen fibrils that resemble or mimic the properties of collagen fibrils produced by particular species or breeds of animals or by animals raised under particular conditions.

Alternatively, fibrillation and processing conditions can be selected to provide collagen fibrils distinct from those found in nature, such as by decreasing or increasing the fibril diameter, degree of alignment, or degree of crosslinking compared to fibrils in natural leather.

A crosslinked network of collagen, sometimes called a hydrogel, may be formed as the collagen is fibrillated, or it may form a network after fibrillation; in some variations, the process of fibrillating the collagen also forms gel-like network. Once formed, the fibrillated collagen network may be further stabilized by incorporating molecules with di-, tri-, or multifunctional reactive groups that include chromium, amines, carboxylic acids, sulfates, sulfites, sulfonates, aldehydes, hydrazides, sulfhydryls, diazarines, aryl-, azides, acrylates, epoxides, or phenols.

The fibrillated collagen network may also be polymerized with other agents (e.g. polymers that are capable of polymerizing or other suitable fibers), which could be used to further stabilize the matrix and provide the desired end structure. Hydrogels based upon acrylamides, acrylic acids, and their salts may be prepared using inverse suspension polymerization. Hydrogels described herein may be prepared from polar monomers. The hydrogels used may be natural polymer hydrogels, synthetic polymer hydrogels, or a combination of the two. The hydrogels used may be obtained using graft polymerization, crosslinking polymerization, networks formed of water soluble polymers, radiation crosslinking, and so on. A small amount of crosslinking agent may be added to the hydrogel composition to enhance polymerization.

Average or individual collagen fibril length may range from 1 to 1000 μm, or from 5 to 500 μm, or from 10 to 200 μm throughout the entire thickness of a biofabricated leather. These ranges include all intermediate values and subranges.

Fibrils may align with other fibrils over from 50 to 500 μm or more of their lengths or may exhibit little or no alignment. In other embodiments, some collagen fibrils can be bundled or aligned into higher order structures.

Collagen fibril density of a biofabricated leather may range from about 1 to 1,000 mg/cc, preferably from 5 to 500 mg/cc including all intermediate values, such as 5, 10, 20, 30, 40, 50, 60, 70, 80, 90, 100, 150, 200, 250, 300, 350, 400, 450, 500, 600, 700, 800, 900 and 1,000 mg/cc and any sub-range bound by these intermediate values.

The collagen fibrils in a biofabricated leather may exhibit a unimodal, bimodal, trimodal, or multimodal distribution, for example, a biofabricated leather may be composed of two different fibril preparations each having a different range of fibril diameters arranged around one of two different modes. Such mixtures may be selected to impart additive, synergistic or a balance of physical properties on a biofabricated leather conferred by fibrils having different diameters.

Natural leather products may contain 150-300 mg/cc collagen based on the weight of the leather product. A biofabricated leather may contain a similar content of collagen or collagen fibrils as conventional leather based on the weight of the biofabricated leather, such as a collagen concentration of 100, 150, 200, 250, 300 or 350 mg/cc, including any sub-range bound by these values.

The fibrillated collagen, sometimes called a hydrogel, may have a thickness selected based on its ultimate use. Thicker or more concentrated preparations of the fibrillated collagen generally produce thicker biofabricated leathers. The final thickness of a biofabricated leather may be only 1, 10, 20, 30, 40, 50, 60, 70, 80 or 90%, or within any range defined by these values, that of the fibril preparation prior to shrinkage caused by crosslinking, dehydration and lubrication.

"Crosslinking" refers to formation (or reformation) of chemical bonds within between collagen molecules. A crosslinking reaction stabilizes the collagen structure and in some cases forms a network between collagen molecules. Any suitable crosslinking agent known in the art can be used including, without limitation, mineral salts such as those based on chromium, formaldehyde, hexamethylene diisocyanate, glutaraldehyde, polyepoxy compounds, gamma irradiation, and ultraviolet irradiation with riboflavin. The crosslinking can be performed by any known method; see, e.g., Bailey et al., Radiat. Res. 22:606-621 (1964); Housley et al., Biochem. Biophys. Res. Commun. 67:824-830 (1975); Siegel, Proc. Natl. Acad. Sci. U.S.A. 71:4826-4830 (1974); Mechanic et al., Biochem. Biophys. Res. Commun. 45:644-653 (1971); Mechanic et al., Biochem. Biophys. Res. Commun. 41:1597-1604 (1970); and Shoshan et al., Biochim. Biophys. Acta 154:261-263 (1968) each of which is incorporated by reference.

Crosslinkers include isocyantes, carbodiimide, poly(aldehyde), poly(azyridine), mineral salts, poly(epoxies), enzymes, thiirane, phenolics, novolac, resole as well as other compounds that have chemistries that react with amino acid side chains such as lysine, arginine, aspartic acid, glutamic acid, hydroxylproline, or hydroxylysine.

A collagen or collagen-like protein may be chemically modified to promote chemical and/or physical crosslinking between the collagen fibrils. Chemical crosslinking may be possible because reactive groups such as lysine, glutamic acid, and hydroxyl groups on the collagen molecule project from collagen's rod-like fibril structure. Crosslinking that involve these groups prevent the collagen molecules from sliding past each other under stress and thus increases the mechanical strength of the collagen fibers. Examples of chemical crosslinking reactions include but are not limited to reactions with the ε-amino group of lysine, or reaction with carboxyl groups of the collagen molecule. Enzymes such as transglutaminase may also be used to generate crosslinks between glutamic acid and lysine to form a stable γ-glutamyl-lysine crosslink. Inducing crosslinking between functional groups of neighboring collagen molecules is known in the art. Crosslinking is another step that can be implemented here to adjust the physical properties obtained from the fibrillated collagen hydrogel-derived materials.

Still fibrillating or fibrillated collagen may be crosslinked or lubricated. Collagen fibrils can be treated with compounds containing chromium or at least one aldehyde group, or vegetable tannins prior to network formation, during network formation, or network gel formation. Crosslinking further stabilizes the fibrillated collagen leather. For example, collagen fibrils pre-treated with acrylic polymer followed by treatment with a vegetable tannin, such as *Acacia Mollissima*, can exhibit increased hydrothermal stability. In other embodiments, glyceraldehyde may be used as a cross-linking agent to increase the thermal stability, proteolytic resistance, and mechanical characteristics, such as Young's modulus and tensile stress, of the fibrillated collagen.

A biofabricated material containing a network of collagen fibrils may contain from 0 to 20% or 5 to 15% or 10% of a crosslinking agent including tanning agents used for conventional leather. The crosslinking agents may be covalently bound to the collagen fibrils or other components of a biofabricated material or non-covalently associated with them. Preferably, a biofabricated leather will contain no more than 1, 2, 3, 4, 5, 6, 7, 8, 9 or 10% of a crosslinking agent.

"Lubricating" describes a process of applying a lubricant, such as a fat or other hydrophobic compound or any material that modulates or controls fibril-fibril bonding during dehydration to leather or to biofabricated products comprising collagen. A desirable feature of the leather aesthetic is the stiffness or hand of the material. In order to achieve this property, water-mediated hydrogen bonding between fibrils and/or fibers is limited in leather through the use of lubricants. Examples of lubricants include fats, biological, mineral or synthetic oils, cod oil, sulfonated oil, polymers, organofunctional siloxanes, and other hydrophobic compounds or agents used for fatliquoring conventional leather as well as mixtures thereof. While lubricating is in some ways analogous to fatliquoring a natural leather, a biofabricated product can be more uniformly treated with a lubricant due to its method of manufacture, more homogenous composition and less complex composition.

Other lubricants include surfactants, anionic surfactants, cationic surfactants, cationic polymeric surfactants, anionic polymeric surfactants, amphiphilic polymers, fatty acids, modified fatty acids, nonionic hydrophilic polymers, nonionic hydrophobic polymers, poly acrylic acids, poly methacrylic, acrylics, natural rubbers, synthetic rubbers, resins, amphiphilic anionic polymer and copolymers, amphiphilic cationic polymer and copolymers and mixtures thereof as well as emulsions or suspensions of these in water, alcohol, ketones, and other solvents.

Lubricants may be added to a biofabricated material containing collagen fibrils. Lubricants may be incorporated in any amount that facilitates fibril movement or that confers leather-like properties such as flexibility, decrease in brittleness, durability, or water resistance. A lubricant content can range from about 0.1 to 60%, or from 10 to 55%, or 20 to 55% by weight, including all sub-ranges defined by these values, of the biofabricated leather.

Other additives may be added to modify the properties of biofabricated leather or material. Suitable additives include but are not limited to dyes, pigments, fragrances, resins, textile binders and microparticles. Resins may be added to modify the stretchability, strength, rigidity, abrasion resistance or softness of the material. Suitable resins include but are not limited to elastomers, acrylic copolymers, polyurethane, and the like. Suitable elastomers include but are not limited to styrene, isoprene, butadiene copolymers such as elastomers, or acrylic resins. Resins may be used at from about 5% to 200%, or from about 50% to 150%, or from 75% to 125% (based on the weight of collagen). The amount of resin may be varied across the material to provide zonal properties in the final product.

Microparticles may aid in forming pores to make the final product porous and breathable. One example is a microparticle such as porogen that is washed out after the material is formed to leave a pore behind. This technique is known in the formation of microporous films. Alternatively, the microparticles may provide cushioning or a softness to the final product. Microparticles may be used at from 0.1% to 10%, or from 1% to 5% by weight of the overall composition. Another technique for providing breathability is to needle punch the biofabricated material.

Carbon black, nanofillers or similar materials may also be added to provide heat transfer to enable warming or cooling in the final product. These materials may be used at from about 0.01% to about 10%, or from 1% to 5% by weight of the overall composition.

Conductive materials such as reduced graphene oxide, and multi and single wall carbon nanotubes may be added to provide electromagnetic benefits that are useful for example in gloves for touchscreen applications. These materials may be used at from about 0.01% to about 10%, or from 1% to 5% by weight of the overall composition.

Luminescent materials, reflective materials, antimicrobial agents, antifungal agents, fragrances and the like may also be useful in the materials of the present invention. These materials may be used at from about 0.01% to about 10%, or from 1% to 5% by weight of the overall composition. The antimicrobial agents, fragrance agents and/or antifungal agents may be absorbed onto particles as is known in the art to provide extended release. For example, the agents may be loaded onto cyclodextrine and the like.

Piezoelectric materials such as quartz, topaz, sucrose and the like may also be useful in the materials of the present invention. These materials may be used at from about 0.01% to about 10%, or from 1% to 5% by weight of the overall composition.

Different batches of biofabricated solutions or concentrates may be prepared with different resins, additives or fillers that provide different properties in the final product. The batches may be prepared and poured or applied side by side and allowed to flow together, then dried to form a biofabricated material having zonal properties.

"Dehydrating" or "dewatering" describes a process of removing water from a mixture containing collagen fibrils and water, such as an aqueous solution, suspension, gel, or hydrogel containing fibrillated collagen. Water may be removed by filtration, evaporation, freeze-drying, solvent exchange, vacuum-drying, convection-drying, heating, irradiating or microwaving, or by other known methods for removing water. In addition, chemical crosslinking of collagen is known to remove bound water from collagen by consuming hydrophilic amino acid residues such as lysine, arginine, and hydroxylysine among others. The inventors have found that acetone quickly dehydrates collagen fibrils and may also remove water bound to hydrated collagen molecules. Water content of a biofabricated material or leather after dehydration is preferably no more than 60% by weight, for example, no more than 5, 10, 15, 20, 30, 35, 40, 50 or 60% by weight of the biofabricated leather. This range includes all intermediate values. Water content is measured by equilibration at 65% relative humidity at 25° C. and 1 atm.

"Grain texture" describes a leather-like texture which is aesthetically or texturally the similar to the texture of a full grain leather, top grain leather, corrected grain leather (where an artificial grain has been applied), or coarser split grain leather texture. Advantageously, the biofabricated material of the invention can be tuned to provide a fine grain, resembling the surface grain of a leather. The biofabricated leather like material may be embossed, debossed or formed over a textured surface to provide aesthetic features in the biofabricated materials.

The articles in the invention may include foot wear, garments, gloves, furniture or vehicle upholstery, jewelry and other leather goods and products. It includes but is not limited to clothing, such as overcoats, coats, jackets, shirts, trousers, pants, shorts, swimwear, undergarments, uniforms, emblems or letters, costumes, ties, skirts, dresses, blouses, leggings, gloves, mittens, shoes, shoe components such as sole, quarter, tongue, cuff, welt, and counter, dress shoes, athletic shoes, running shoes, casual shoes, athletic, running or casual shoe components such as toe cap, toe box, outsole, midsole, upper, laces, eyelets, collar, lining, Achilles notch, heel, and counter, fashion or women's shoes and their shoe components such as upper, outer sole, toe spring, toe box, decoration, vamp, lining, sock, insole, platform, counter, and heel or high heel, boots, sandals, buttons, sandals, hats, masks, headgear, headbands, head wraps, and belts; jewelry such as bracelets, watch bands, and necklaces; gloves, umbrellas, walking sticks, wallets, mobile phone or wearable computer coverings, purses, backpacks, suitcases, handbags, folios, folders, boxes, and other personal objects; athletic, sports, hunting or recreational gear such as harnesses, bridles, reins, bits, leashes, mitts, tennis rackets, golf clubs, polo, hockey, or lacrosse gear, chessboards and game boards, medicine balls, kick balls, baseballs, and other kinds of balls, and toys; book bindings, book covers, picture frames or artwork; furniture and home, office or other interior or exterior furnishings including chairs, sofas, doors, seats, ottomans, room dividers, coasters, mouse pads, desk blotters, or other pads, tables, beds, floor, wall or ceiling coverings, flooring; automobile, boat, aircraft and other vehicular products including seats, headrests, upholstery, paneling, steering wheel, joystick or control coverings and other wraps or coverings.

Physical Properties of a biofabricated network of collagen fibrils or a biofabricated leather may be selected or tuned by selecting the type of collagen, the amount of concentration of collagen fibrillated, the degree of fibrillation, crosslinking, dehydration and lubrication.

Many advantageous properties are associated with the network structure of the collagen fibrils which can provide strong, flexible and substantially uniform properties to the resulting biofabricated material or leather. Preferable physical properties of the biofabricated leather according to the invention include a tensile strength ranging from 1, 2, 3, 4, 5, 6, 7, 8, 9, 10, 11, 12, 13, 14, 15 or more MPa, a flexibility determined by elongation at break ranging from 1, 5, 10, 15, 20, 25, 30% or more, softness as determined by ISO 17235 of 4, 5, 6, 7, 8 mm or more, a thickness ranging from 0.2, 0.3, 0.4, 0.5, 0.6, 0.7, 0.8, 0.9, 1.0, 1.1, 1.2, 1.3. 1.4, 1.5, 1.6, 1.7, 1.8, 1.9, 2.0 mm or more, and a collagen density (collagen fibril density) of 10, 20, 30, 40, 50, 60, 70, 80, 90, 100, 200, 300, 400, 500, 600, 700, 800, 900, 1,000 mg/cc or more, preferably 100-500 mg/cc. The above ranges include all subranges and intermediate values defined by the recited values.

Thickness. Depending on its ultimate application a biofabricated material or leather may have any thickness. Its thickness preferably ranges from about 0.05 mm to 20 mm as well as any intermediate value within this range, such as 0.05, 0.1, 0.2, 0.5, 1, 2, 3, 4, 5, 6, 7, 8, 9, 10, 11, 12, 13, 14, 15, 16, 17, 18, 19, 20, 25, 30, 40, 50 mm or more, including all subranges defined by the recited values. The thickness of a biofabricated leather can be controlled by adjusting collagen content. Another method for providing zonal properties is to have varying thicknesses within one material.

Elastic modulus. The elastic modulus (also known as Young's modulus) is a number that measures an object or substance's resistance to being deformed elastically (i.e., non-permanently) when a force is applied to it. The elastic modulus of an object is defined as the slope of its stress-strain curve in the elastic deformation region. A stiffer material will have a higher elastic modulus. The elastic modulus can be measured using a texture analyzer. Another method for providing zonal properties is to have different elasticity regions across the material.

A biofabricated leather can have an elastic modulus of at least 100 kPa. It can range from 100 kPa to 1,000 MPa as well as any intermediate value in this range, such as 0.1, 0.2, 0.3, 0.4, 0.5, 0.6, 0.7, 0.8, 0.9, 1, 2, 3, 4, 5, 6, 7, 8, 9, 10, 50, 100, 200, 300, 400, 500, 600, 700, 800, 900, or 1,000 MPa, and any subrange defined by these values. A biofabricated leather may be able to elongate up to 300% from its relaxed state length, for example, by >0, 1, 2, 3, 4, 5, 6, 7, 8, 9, 10, 20, 30, 40, 50, 60, 70, 80, 90, 100, 150, 200, 250, or 300%, and any subrange defined by these values of its relaxed state length.

Tensile strength (also known as ultimate tensile strength) is the capacity of a material or structure to withstand loads tending to elongate, as opposed to compressive strength, which withstands loads tending to reduce size. Tensile strength resists tension or being pulled apart, whereas compressive strength resists compression or being pushed together.

A sample of a biofabricated material may be tested for tensile strength using an Instron machine. Clamps are attached to the ends of the sample and the sample is pulled in opposite directions until failure. Good strength is demonstrated when the sample has a tensile strength of at least 1 MPa. A biofabricated leather can have a tensile strength of at least 1 kPa. It can range from 1 kPa to 100 MPa as well as any intermediate value in this range, such as 1, 2, 3, 4, 5, 6, 7, 8, 9, 10, 50, 100, 200, 300, 400, 500 kPA; 0.5, 0.6, 0.7, 0.8, 0.9, 1.0, 1.1, 1.2, 1.3, 1.4, 1.5, 2, 3, 4, 5, 6, 7, 8, 9, 10, 20, 30, 40, 50, 60, 70, 80, 90, or 100 MPa, and any subrange defined by these values.

Tear strength (also known as tear resistance) is a measure of how well a material can withstand the effects of tearing. More specifically however it is how well a material (normally rubber) resists the growth of any cuts when under tension, it is usually measured in kN/m. Tear resistance can be measured by the ASTM D 412 method (the same used to measure tensile strength, modulus and elongation). ASTM D 624 can be used to measure the resistance to the formation of a tear (tear initiation) and the resistance to the expansion of a tear (tear propagation). Regardless of which of these two is being measured, the sample is held between two holders and a uniform pulling force applied until the aforementioned deformation occurs. Tear resistance is then calculated by dividing the force applied by the thickness of the material. A biofabricated leather may exhibit tear resistance of at least 1, 2, 3, 4, 5, 6, 7, 8, 9, 10, 15, 20, 25, 30, 35, 40, 45, 50, 100, 150 or 200% more, and any subrange defined by these values, than that of a conventional top grain or other leather of the same thickness comprising the same type of collagen, e.g., bovine Type I or Type III collagen, processed using the same crosslinker(s) or lubricants. A biofabricated material may have a tear strength ranging from about 1 to 500 N, for example, 1, 2, 3, 4, 5, 6, 7, 8, 9, 10, 20, 30, 40, 50, 60, 70, 80, 90, 100, 125, 150, 175, 200, 225, 250, 275, 300, 325, 350, 375, 400, 425, 450, 475, or 500 as well as any intermediate tear strength within this range and any subrange defined by these values.

Softness. ISO 17235:2015 specifies a non-destructive method for determining the softness of leather. It is applicable to all non-rigid leathers, e.g. shoe upper leather, upholstery leather, leather goods leather, and apparel leather. A biofabricated leather may have a softness as determined by ISO 17235 of 2, 3, 4, 5, 6, 7, 8, 10, 11, 12 mm or more and any subrange defined by these values.

Grain. The top grain surface of leather is often regarded as the most desirable due to its soft texture and smooth surface. The top grain is a highly porous network of collagen fibrils. The strength and tear resistance of the grain is often a limitation for practical applications of the top grain alone and conventional leather products are often backed with corium having a much coarser grain. A biofabricated material as disclosed herein which can be produced with strong and uniform physical properties or increased thickness can be used to provide top grain like products without the requirement for corium backing.

Content of other components. In some embodiments, the collagen is free of other leather components such as elastin or non-structural animal proteins. However, in some embodiments the content of actin, keratin, elastin, fibrin, albumin, globulin, mucin, mucinoids, noncollagen structural proteins, and/or noncollagen nonstructural proteins in a biofabricated leather may range from 0, 1, 2, 3, 4, 5, 6, 7, 8, 9 to 10% by weight, and any subrange defined by these values, of the biofabricated leather. In other embodiments, a content of actin, keratin, elastin, fibrin, albumin, globulin, mucin, mucinoids, noncollagen structural proteins, and/or noncollagen nonstructural proteins may be incorporated into a biofabricated leather in amounts ranging from >0, 1, 2, 3, 4, 5, 6, 7, 8, 9, 10, 11, 12, 13, 14, 15, 16, 17, 18, 19, 20% or more, and any subrange defined by these values, by weight of a biofabricated leather. Such components may be introduced during or after fibrillation, cross-linking, dehydration or lubrication.

A "leather dye" refers to dyes which can be used to color leather or biofabricated leather. These include acidic dyes, direct dyes, lakes, sulfur dyes, basic dyes and reactive dyes. Dyes and pigments can also be incorporated into a precursor of a biofabricated leather, such as into a suspension or network gel comprising collagen fibrils during production of the biofabricated leather.

"Fillers". In some embodiments a biofabricated leather may comprise fillers, other than components of leather, such as microspheres. One way to control the organization of the dehydrated fibril network is to include filling materials that keep the fibrils spaced apart during dehydration. These filler materials include nanoparticles, microparticles, or various polymers such as syntans commonly used in the tanning industry. These filling materials could be part of the final dehydrated leather material, or the filling materials could be sacrificial, that is they are degraded or dissolved away leaving open space for a more porous fibril network. The shape and dimension of these fillers may also be used to control the orientation of the dehydrated fibril network.

In some embodiments a filler may comprise polymeric microsphere(s), bead(s), fiber(s), wire(s), or organic salt(s). Other materials may also be embedded or otherwise incorporated into a biofabricated leather or into a network of collagen fibrils according to the invention. These include, but are not limited to fibers, including both woven and nonwoven fibers as well as cotton, wool, cashmere, angora, linen, bamboo, bast, hemp, soya, seacell, fibers produced from milk or milk proteins, silk, spider silk, other peptides or polypeptides including recombinantly produced peptides or polypeptides, chitosan, mycelium, cellulose including bacterial cellulose, wood including wood fibers, rayon, lyocell, vicose, antimicrobial yarn (A.M.Y.), Sorbtek, nylon, polyester, elastomers, spandex or elastane and other polyester-polyurethane copolymers, carbon including carbon fibers and fullerenes, glass including glass fibers and nonwovens, silicon and silicon-containing compounds, minerals, including mineral particles and mineral fibers, and metals or metal alloys, including those comprising iron, steel, lead, gold, silver, platinum, copper, zinc and titanium, which may be in the form of particles, fibers, wires or other forms suitable for incorporating into biofabricated leather. Such fillers may include an electrically conductive material, magnetic material, fluorescent material, bioluminescent material, phosphorescent material or other photoluminescent material, or combinations thereof. Mixtures or blends of these components may also be embedded or incorporated into a biofabricated leather, for example, to modify the chemical and physical properties disclosed herein.

Various forms of collagen are found throughout the animal kingdom. The collagen used herein may be obtained from animal sources, including both vertebrates and invertebrates, or from synthetic sources. Collagen may also be sourced from byproducts of existing animal processing. Collagen obtained from animal sources may be isolated using standard laboratory techniques known in the art, for example, Silva et. Al., Marine Origin Collagens and its Potential Applications, March Drugs, 2014 December, 12(12); 5881-5901).

The collagen described herein also may be obtained by cell culture techniques including from cells grown in a bioreactor.

Collagen may also be obtained via recombinant DNA techniques. Constructs encoding non-human collagen may be introduced into host organisms to produce non-human collagen. For instance, collagen may also be produced with yeast, such as *Hansenula polymorpha, Saccharomyces cerevisiae, Pichia pastoris* and the like as the host. Further, in recent years, bacterial genomes have been identified that provide the signature (Gly-Xaa-Yaa)n repeating amino acid sequence that is characteristic of triple helix collagen. For example, gram positive bacterium *Streptococcus pyogenes* contains two collagen-like proteins, Sc11 and Sc12 that now have well characterized structure and functional properties. Thus, it would be possible to obtain constructs in recombinant *E. coli* systems with various sequence modifications of either Sc11 or Sc12 for establishing large scale production methods. Collagen may also be obtained through standard peptide synthesis dcv techniques. Collagen obtained from any of the techniques mentioned may be further polymerized. Collagen dimers and trimers are formed from self-association of collagen monomers in solution.

Materials that are useful in the present invention include but are not limited to biofabricated materials, natural or synthetic woven fabrics, non-woven fabrics, knitted fabrics, mesh fabrics, and spacer fabrics.

Any material that retains the collagen fibrils can be useful in the present invention. In general, fabrics that are useful have a mesh ranging from 300 threads per square inch to 1 thread per square foot or a pore size greater than or equal to about 11 μm in diameter. Spun lace materials may also be useful. In some embodiments, water soluble fabrics are useful. When utilized, the portion of the fabric exposed to the solution of collagen dissolves forming a void or hole in the fabric, and the collagen fills the void or hole. Water soluble fabrics are typically formed from polyvinyl alcohol fibers and coated with a resin such as polyvinyl alcohol, polyethylene oxide, hydroxyalkylcellulose, carboxymethylcellulose, polyacrylamide, polyvinyl pyrrolidone, polyacrylate and starch. Alternatively, the void or hole may be covered with a secondary material such as, natural or synthetic woven fabrics, non-woven fabrics, knitted fabrics, mesh fabrics, and spacer fabrics.

Alternatively, biofabricated material may be used to plug a void or hole cut into fabric. The size of the void or hole may vary depending on the design to be imparted. The shape of the void or hole may vary depending on the design. Suitable dimensions of void or holes may range from about 0.1 inches to about 5 meters or from 6 inches to 3 meters, or from 1 feet to 2 meters. Suitable shapes include but are not limited to circles, squares, rectangles, triangles, elliptical, ovals and brand logos.

Some materials lend themselves to pretreatment to improve bonding of biofabricated materials. Pretreatment may include collagen coating, resin coating, devore of the fabric (also known as burn-out method), chemical or combinations thereof. For example, a chemical pretreatment for materials made from cellulose fibers, may include periodate (an oxidant) solution treatment. Suitable cellulose fabrics are selected from the group consisting of viscose, acetate, lyocell, bamboo and combinations thereof. The oxidant opens sugar rings in the cellulose and enable the collagen to bind to the open rings. The concentration of the oxidant in the solution depends on the extent of oxidation desired. In general, higher the concentration of oxidant or longer the reaction time, higher degree of oxidation is achieved. In an embodiment of the present invention, the oxidation reaction may be carried out for a desired amount of time to achieve the desired level of oxidation. The oxidation reaction can be carried out at various temperatures, depending on the type of oxidant used. The inventors have preferred using controlled oxidation at room temperature over a time range of 15 minutes-24 hours. For example, it is envisioned that the minimum time is at least 15 min, at least 30 min, at least 1 hr, at least 2 hrs, at least 5 hrs, and at least 7.5 hrs, while the maximum time is at most 24 hrs, at most 18 hrs, at most 15 hrs, at most 12 hrs, and at least 10 hrs, as well as all sub-ranges defined by these values. The amount of sodium periodate ranges from 1% to 50%, or from 2 to 20%, or 10% offers on weight of the fabric. As used herein, offer means the amount of an additive based on the weight % of collagen. Other chemical pretreatments are taught in *Bioconjugate Techniques* by Greg Hermanson, which is hereby incorporated by reference.

Quenching the periodate with a glycol, e.g., ethylene glycol, propylene glycol, diethylene glycol, dipropylene glycol, triethylene glycol, polyethylene glycol, butylene glycol or a combination thereof, rinsing the fabric with water and drying the fabric. The fabric may be natural, synthetic or a combination thereof and may be woven, non-woven, a knit or a combination thereof and may have a mesh ranging from 300 threads per square inch to 1 thread per square foot or a pore size greater than or equal to 11 µm in diameter. The fibers of the fabric may comprise protein, cellulose, or a combination thereof. The edges of the fabric may be devoured.

The fabric may also be pretreated with a collagen solution such as by applying a 0.5 mg/ml to 10 mg/ml collagen solution to the fabric and/or pouring a collagen solution into a container, cooling the container, mixing the solution, adding a buffer to the solution to induce fibrillation, filtering the solution through the fabric, placing the fabric and the filtrate in the container and mixing.

The biofabricated solution as described herein may include any appropriate non-human collagen source and/or combination as discussed herein.

As an initial step in the formation of the collagen materials described herein, the starting collagen material may be placed in solution and fibrillated. The collagen concentration may range from approximately 0.1 g/L to 10 g/L, or from 5 g/L to 10 g/L, or 10%. Collagen fibrillation may be induced through the introduction of salts to the collagen solution. The addition of a salt or a combination of salts such as sodium phosphate, potassium phosphate, potassium chloride, and sodium chloride to the collagen solution may change the ionic strength of the collagen solution. Collagen fibrillation may occur as a result of increasing electrostatic interactions, through greater hydrogen bonding, Van der Waals interactions, and covalent bonding. Suitable salt concentrations may range, for example, from approximately 10 mM to 5M, or from 100 mM to 3M, or from 200 mM to 1 M, or 250 mM.

A collagen network may also be highly sensitive to pH. During the fibrillation step, the pH may be adjusted to control fibril dimensions such as diameter and length. Suitable pH may range from approximately 5.5 to 10. After the fibrillation step prior to filtration, the pH of the solution is adjusted to a pH range from approximately 3.5 to 10, for example 3.5 to 7, or 3.5 to 5. The overall dimensions and organization of the collagen fibrils will affect the toughness, stretch-ability, and breathability of the resulting fibrillated collagen derived materials. This may be of use for fabricating fibrillated collagen derived leather for various uses that may require different toughness, flexibility, and breathability.

One way to control the organization of the dehydrated fibril network is to include filling materials that keep the fibrils spaced apart during drying. These filler materials could include nanoparticles, microparticles, microspheres, microfibers, or various polymers commonly used in the tanning industry. These filling materials could be part of the final dehydrated leather material, or the filling materials could be sacrificial, that is they are degraded or dissolved away leaving open space for a more porous fibril network.

The collagen or collagen-like proteins may be chemically modified to promote chemical and physical crosslinking between the collagen fibrils. Collagen-like proteins were taught in the United States patent application US 2012/0116053 A1, which is hereby incorporated by reference. Chemical crosslinking may be possible because reactive groups such as lysine, glutamic acid, and hydroxyl groups on the collagen molecule project from collagen's rod-like fibril structure. Crosslinking that involve these groups prevent the collagen molecules from sliding past each other under stress and thus increases the mechanical strength of the collagen fibers. Examples of chemical crosslinking reactions include but are not limited to reactions with the ε-amino group of lysine, or reaction with carboxyl groups of the collagen molecule.

Enzymes such as transglutaminase may also be used to generate crosslinks between glutamic acid and lysine to form a stable γ-glutamyl-lysine crosslink. Inducing crosslinking between functional groups of neighboring collagen molecules is known in the art. Crosslinking is another step that can be implemented here to adjust the physical properties obtained from the fibrillated collagen hydrogel-derived materials.

Once formed, the fibrillated collagen network may be further stabilized by incorporating molecules with di-, tri-, or multifunctional reactive groups that include chromium, amines, carboxylic acids, sulfates, sulfites, sulfonates, aldehydes, hydrazides, sulfhydryls, diazarines, aryl-, azides, acrylates, epoxides, or phenols.

The fibrillated collagen network may also be polymerized with other agents (e.g. polymers that are capable of polymerizing or other suitable fibers) that form a hydrogel or have fibrous qualities, which could be used to further stabilize the matrix and provide the desired end structure. Hydrogels based upon acrylamides, acrylic acids, and their salts may be prepared using inverse suspension polymerization. Hydrogels described herein may be prepared from polar monomers. The hydrogels used may be natural polymer hydrogels, synthetic polymer hydrogels, or a combination of the two. The hydrogels used may be obtained using graft polymerization, crosslinking polymerization, networks formed of water soluble polymers, radiation crosslinking, and so on. A small amount of crosslinking agent may be added to the hydrogel composition to enhance polymerization.

The viscosity of the collagen solution can range from 1 cP to 50000 cP at 20° C., or from 1000 cP to 40000 cP, or from 5000 cP to 10000 cP. The solutions can be poured, sprayed, painted, or applied to a surface. The viscosity may vary depending on how the final material is formed. Where a higher viscosity is desired, known thickening agents such as carboxymethylcellulose and the like can be added to the solution. Alternatively, the amount of collagen in the solution can be adjusted to vary the viscosity.

The flexibility in the collagen solution enables the production of new materials made entirely through the deposition of said collagen solution, for example the creation of biofabricated leather lace materials or 3-dimensional materials. In a sense, the collagen solution can be poured, pipetted, dripped, sprayed through a nozzle, painted or paletted, screen printed, or robotically applied or dip a secondary material into the collagen solution. A textured surface can be achieved through utilizing an apertured material in the formation process of the material. The collagen composition also enables the use of masking, stenciling and molding techniques. The application of the biofabricated leather solution also enables modifying the properties of the material to which it is applied. For example, the biofabricated leather solution can make the end material stronger, more supple, more rigid, more flexible, more elastic or softer.

In one embodiment, the collagen solution is filtered to remove water and create a concentrate. By concentrate is meant a viscous flowable material. The concentrate contains from 1% to 30%, or from 2% to 20%, or from 3% to 10%, or from 4% to 8% by weight of fibrillated collagen. In this state, the collagen can be mixed with other materials providing different properties than from the collagen solution. For example, the concentrate can be mixed in extruders such as single screw or twin screw extruders. Materials that can be mixed with the concentrate in the extruder include resins, cross-linkers, dyes or pigments, fat-liquors, fibers, binders, microspheres fillers and the like. Due to its higher viscosity the concentrate can be applied to different substrates with different techniques, for example palleting. The same materials can be mixed with conventional techniques as well. The amounts of binder or adhesive can range from 1:3 to 1:1 (binder/adhesive to collagen), for example 1:2.5 to 1:1, 1:2 to 1:1, 1:2 to 1:1.5, 1:2.5 to 1:10. The concentrate at the lower end of the weight of fibrillation collagen range may be filtered and dried and the concentrate at the higher end of the weight of fibrillation collagen range may be dried.

As mentioned, a biofabricated leather material derived from the methods described above may have similar gross structural and physical characteristics as leathers produced from animal hides. In general, the biofabricated leather materials described herein may be derived from sources other than sheets or pieces of animal hide or skin, although animal hide or skin may be the source of the collagen used in preparing the fibrillated collagen. The source of the collagen or collagen-like proteins may be isolated from any animal (e.g. mammal, fish), or more particularly cell/tissue cultured, source (including in particular microorganism).

The biofabricated leather material may include agents that stabilize the fibril network contained therein or may contain agents that promote fibrillation. As mentioned in previous sections, cross-linking agents (to provide further stability), nucleating agents (to promote fibrillation), and additional polymerizing agents (for added stability) may be added to the collagen solution prior to fibrillation (or after) to obtain a fibrillated collagen material with desired characteristics (e.g. strength, bend, stretch, and so forth).

As mentioned, following dehydration or drying, the engineered biofabricated leather materials derived from the methods discussed above have a water content of less than 20% by weight, for example less than 15% by weight, less than 12.5% by weight, or less than 10% by weight. The water content of the engineered biofabricated leather materials may be fine-tuned in the finishing steps to obtain leather materials for differing purposes and desired characteristics.

As mentioned, any of these biofabricated leathers may be tanned (e.g., using a tanning agent including vegetable (tannins), chromium, alum, zirconium, titanium, iron salts, or a combination thereof, or any other appropriate tanning agent). Thus, in any of the resulting biofabricated leather materials described herein, the resulting material may include a percent (e.g., between 0.01% and 10%) of a residual tanning agent (e.g. tannin, chromium, etc.). Thus, the collagen fibrils in the resulting biofabricated leather material are modified to be tanned, e.g., cross-linked to resist degradation.

The biofabricated leather materials may be treated to provide surface textures. Suitable treatments include but are not limited to embossing, debossing, filling in of molds, coating of textured surfaces, and vacuum forming with an apertured plate below the material. As is known in the art, the pressure and temperature at which the embossing and debossing are performed may vary depending on the desired texture and design. Surface coating and finishes known in the leather industry may be applied to the biofabricated leather materials. Alternatively, a textured surface may be created using the concentrate by applying the concentrate on a surface and using a tool such as a toothpick, a needle, and the like to pull peaks.

As mentioned above, in any of the variations for making the biofabricated leathers described herein, the material could be tanned (cross-linked) as the collagen is fibrillated and/or separately after fibrillation has occurred, prior to dehydration. For example, tanning may include crosslinking using an aldehyde (e.g., Glutaraldehyde) and/or any other tanning agent. Thus in general a tanning agent includes any collagen fibril cross-linking agent such as aldehydes cross linkers, chromium, amine, carboxylic acid, sulfate, sulfite, sulfonate, aldehyde, hydrazide, sulfhydryl, diazirine, Some methods for making a material including a biofabricated leather material include providing a material, pretreating the material to make it suitable for bonding with collagen, applying collagen solution to the material and drying. Drying may include removing water through a vacuum, heated air drying, ambient air drying, heated pressing and pressure drying. Where pretreatment is required, the pretreatment is either cutting voids or holes into the material, chemically removing certain fibers and treating the material with a chemical or collagen solution. Other methods do not require a pretreatment of the material. Where pretreatment is not required, the material is either partially water soluble or retains collagen but allows water to pass through. Suitable mesh sizes range from 300 threads per square inch to 1 thread per square foot. As used herein, the term bonded or bonding to the fabric mean attached such that the biofabricated leather does not easily peel away from the fabric when pulled by hand. A suitable method for testing the efficacy of bonding is a peel strength test performed on an instrument such as an Instron material testing machine. Jaws of the machine are attached to the biofabricated leather material and the material which it was bonded to, and the jaws are pulled apart until the materials tear or separate. The force to tear is reported in N/mm. Suitable peel strengths range from about 0.5 N/mm to 100 N/mm, inclusive of all values and ranges there between, for example, 1, 2, 3, 5, 7.5, 9, 10, 12.5, 15, 18.75, 20, 21, 24.5, 30, 33.25, 35, 40, 42.5, 47.75, 50, 55, 60, 65, 70, 75, 79, 80, 85, 90, 91, 92, 93, 94, and 95, and all subranges defined by these values.

The present invention is represented by the following exemplary embodiments:

[1] An article, comprising: biofabricated material having zonal properties.

[2] The article of [1], wherein the biofabricated material comprises recombinant collagen.

[3] The article of [2], wherein the recombinant collagen is selected from the group consisting of bovine, porcine, kangaroo, sheep, alligator, and combinations thereof.

[4] The article of [3], wherein the collagen is Type III bovine collagen.

[5] The article of [1], wherein the zonal properties are selected from the group consisting of colors, breathability, stretchability, tear strength, softness, rigidity, abrasion resistance, heat transfer to enable warming or cooling, electromagnetic, luminescence, reflectance, antimicrobial, antifungal, fragrance and combinations thereof.

[6] The article of [1], wherein the zonal properties are selected from layer to layer, side by side and at least one material with one property surrounding another material with a different property.

[7] A method of making a biofabricated material having zonal properties, the method comprising:

placing a material on a surface; placing a second material with different properties next to the first material; applying an aqueous solution of collagen over the two materials; and drying to form the biofabricated material having zonal properties.

[8] The method of [7], wherein said first material and said second material are fibrous materials.

[9] The method of [7], wherein a single aqueous solution of collagen is poured over said first material and said second material.

[10] A method of making a biofabricated material having zonal properties, the method comprising:

providing a first aqueous solution of collagen; providing a second aqueous solution of collagen having at least one property different than said first aqueous solution; applying the two aqueous solutions and allowing the two solutions to flow together in a center portion; and drying to form the biofabricated material having zonal properties.

[11] The method of [10], wherein the two aqueous solutions are poured side by side.

[12] The method of [10], wherein the two aqueous solutions are poured in a patterned manner.

[13] A method of making a biofabricated material having zonal properties, the method comprising:

providing a first aqueous solution of collagen; providing a second aqueous solution of collagen having at least one property different than said first aqueous solution; pouring the first aqueous solution and allowing the first layer to dry; pouring the second aqueous solution on top of the first layer; and drying to form the biofabricated material having zonal properties.

The following examples are for illustrative purposes. The claims should not be limited to the details therein.

Example 1

A piece of non-woven fabric (3" in diameter, Polyethylene Terephthalate) was purchased with a Young's modulus of 0.0272955 MPa/% in the A direction and 0.00719 MPa/% in the B direction. A second piece of woven fabric (3" in diameter, Polyethylene Terephthalate) was purchased with a Young's modulus of 4.897 MPa/% in the A direction and 2.165 MPa/% in the B direction. The unit MPa/% was mega Pascal per % elongation. The two pieces of fabrics were cut in half and placed side by side on a filter paper (Whatman Grade 1 filter paper, Sigma Aldrich) and inside of a Buchner funnel having a diameter of 3 inches. A solution (75 mL) of fibrillated, cross-linked, and fat liquored collagen was poured onto the fabric and filter paper and vacuum was applied (25 in Hg). The fabric and biofabricated material was removed from the Buchner funnel and dried for 24 hours in room temperature. The biofabricated material was bonded onto the surface of the fabric such that it does not easily peel away from the fabric when pulled by hand. A biofabricated material having zonal properties was formed. The region with the woven and higher Young's modulus was stiffer and stronger whereas the region with non woven and lower Young's modulus was softer with higher elongation.

The fibrillated, cross-linked, and fat liquored collagen solution was made by dissolving collagen in 0.1N HCl at 10 g/L and was stirred at 500 rpm for 3 hours. The pH was adjusted to 7.2 by adding 1 part 10× PBS to 9 parts collagen by weight and the solution was stirred at 350 rpm for 3 hours. 10% gluteraldehyde (by weight of collagen) was added and mixed for one hour. The pH was maintained above 10 by adding 20% sodium carbonate and the solution was stirred overnight at 350 rpm. The following day, the fibrils were washed once in a centrifuge and re-suspended to the proper volume and mixed at 350 rpm. Then the pH was adjusted to 7.0 with 10% formic acid. Then 50% offer of 40% truposol BEN and truposis G solution (by weight of collagen) was added and mixed for 30 mins. 10% microspheres (by weight of collagen) and 10% black pigment (by weight of collagen) were added and mixed for 30 min. 100% Hycar26652 (by weight of collagen) was added and mixed for 30 mins. Lastly, the pH was adjusted to 4 with formic acid.

Example 2

A piece of non-woven fabric (3" in diameter, Polyethylene Terephthalate) was purchased with a Young's modulus of 0.0272955 MPa/% in the A direction and 0.00719 MPa/% in the B direction. A second piece of woven fabric (3" in diameter, Polyethylene Terephthalate) with a Young's modulus of 4.897 MPa/% in the A direction and 2.165 MPa/% in the B direction. The unit MPa/% was mega Pascal per % elongation. The two pieces of fabrics were cut in half and placed side by side on a filter paper (Whatman Grade 1 filter paper, Sigma Aldrich) and inside of a Buchner funnel having a diameter of 3 inches. A solution (75 mL) of fibrillated, cross-linked, and fat liquored collagen was poured onto the fabric and filter paper and vacuum was applied (25 in Hg). The fabric and biofabricated material was removed from the Buchner funnel and dried for 24 hours in room temperature. The biofabricated material was bonded onto the surface of the fabric such that it does not easily peel away from the fabric when pulled by hand. A biofabricated material having zonal properties was formed. The region with the woven and higher Young's modulus was stiffer and stronger whereas the region with non woven and lower Young's modulus was softer with higher elongation.

A fibrillated, cross-linked, and fat liquored collagen paste was made by dissolving collagen in 0.1N HCl at 10 g/L and was stirred at 500 rpm for 3 hours. The pH was adjusted to 7.2 by adding 1 part 10× PBS to 9 parts collagen by weight and the solution was stirred at 350 rpm for 3 hours. 10% tanning agent (by weight of collagen, e.g. glutaraldehyde) was added and mixed for 10 mins. The pH was maintained above 8.5 by adding 20% sodium carbonate and the solution was stirred overnight at 350 rpm. The following day, the fibrils were washed once in a centrifuge and re-suspended to the proper volume and mixed at 350 rpm. Then the pH was adjusted to 7.0 with 10% formic acid. 100% Hystretch v60 resin (by weight of collagen) was added and mixed for 30 mins. 100% offer of 20% truposol BEN (by weight of collagen) was added and mixed for 30 mins. 10% microspheres (by weight of collagen) and 10% white pigment (by weight of collagen) were added and the pH was adjusted to 4.5 with 10% formic acid. Lastly, the solution was filtered and stirred each time the weight of the filtrate reaches 50% of the weight of the solution, three times. 100 g of this final paste was then weighed out and added to 100 g of a textile binder (AquaBrite Black, purchased from Holden's Screen Supply) and mixed for 1 hour on a caframo mixer. The final concentration of solids was 10%, or one part solids to 9 parts water.

Example 3

A fibrillated, cross-linked, and fat liquored collagen paste was made by dissolving collagen in 0.1N HCl at 10 g/L and was stirred at 500 rpm for 3 hours. The pH was adjusted to 7.2 by adding 1 part 10× PBS to 9 parts collagen by weight and the solution was stirred at 350 rpm for 3 hours. 10% tanning agent (by weight of collagen, e.g. glutaraldehyde) was added and mixed for 10 mins. The pH was maintained above 8.5 by adding 20% sodium carbonate and the solution was stirred overnight at 350 rpm. The following day, the fibrils were washed once in a centrifuge and re-suspended to the proper volume and mixed at 350 rpm. Then the pH was adjusted to 7.0 with 10% formic acid. 100% Hystretch v60 resin (by weight of collagen) was added and mixed for 30 mins. 100% offer of 20% fat liquor (by weight of collagen) was added and mixed for 30 mins. 10% microspheres (by weight of collagen) and 10% white pigment (by weight of collagen) were added and the pH was adjusted to 4.5 with 10% formic acid. Lastly, the solution was filtered and stirred each time the weight of the filtrate reaches 50% of the weight of the solution, three times. 100 g of this final paste was then weighed out and added to 100 g of a textile binder (AquaBrite Black, purchased from Holden's Screen Supply) and mixed for 1 hour on a caframo mixer. The final concentration of solids was 10%, or one part solids to 9 parts water.

A second fibrillated, cross-linked, and fat liquored collagen paste was made using the same procedure with the same materials except Hycar 26552 resin was substituted for Hystretch v60. The two collagen pastes were applied side by side, allowed to come together in a central portion and allowed to dry forming a biofabricated material with zonal properties, where the side with the Hystretch resin will be softer and have less stress per strain.

Example 4

A piece of non-woven fabric (Lyocell 50% & Organic Cotton 50%) was purchased from Simplifi Fabric) having a length of 2 feet and a width of 2 feet. A second piece of woven fabric (Cotton) was purchased from Whaleys having a length of 2 feet and a width of 2 feet. The two pieces of fabrics were placed on a surface where the two edges of each piece of material were brought into a 1-inch gap and held in place on a large Buchner funnel with a filter paper underneath the fabrics. A solution of fibrillated, cross-linked, and fat liquored collagen from Example 1 was poured onto the fabrics and filter paper and vacuum was applied. The fabrics and biofabricated material were removed from the Buchner funnel and dried for 24 hours at room temperature. The biofabricated leather was bonded to the fabrics such that it does not easily peel away from the fabric when pulled by hand. A biofabricated material having zonal properties was formed. The region with the woven and higher Young's modulus was stiffer and stronger whereas the region with non woven and lower Young's modulus was softer with higher elongation.

Example 5

A piece of non-woven fabric (Lyocell 50% & Organic Cotton 50%) was purchased from Simplifi Fabric) having a length of 2 feet and a width of 2 feet. A second piece of woven fabric (Cotton) was purchased from Whaleys having a length of 2 feet and a width of 2 feet. The two pieces of fabrics were placed on acetate where the two edges of each piece of material were brought into a 1-inch gap and held in place with a rubber stencil (1/16 inch, purchased from McMaster Carr). A solution of fibrillated, cross-linked, and fat liquored collagen paste from Example 2 was applied onto the fabrics. The fabrics and biofabricated material were dried for 24 hours at room temperature. The biofabricated leather was bonded to the fabrics such that it does not easily peel away from the fabric when pulled by hand. A biofabricated material having zonal properties was formed. The region with the woven and higher Young's modulus was stiffer and stronger whereas the region with non woven and lower Young's modulus was softer with higher elongation.

Example 6

A piece of cellulose fabric was (3" diameter circles, Lyocell 50% & Organic Cotton 50%) purchased from Simplifi Fabric and treated with a sodium periodate solution. Sodium periodate (25% offers on weight of fabric) was dissolved in 200 mL distilled water and the fabric was added and mixed overnight. The next morning, the fabric was quenched using ethylene glycol (10 mL), rinsed with cold water and dried. A second piece of cellulose fabric (3" diameter circles, Lyocell 50% & Organic Cotton 50%) was purchased from Simplifi Fabric. The two pieces of fabrics were cut in half and placed side by side in a Buchner funnel having a diameter of 3 inches. The Buchner funnel had a filter paper (Whatman Grade 1 filter paper) purchased from Sigma Aldrich. A solution (75 mL) of fibrillated, cross-linked, and fat liquored collagen from Example 1 was poured onto the fabric and filter paper and vacuum was applied (25 inHg). The fabric and biofabricated material were removed from the Buchner funnel and dried for 24 hours at room temperature. The biofabricated leather was bonded to the fabric such that it did not easily peel away from the fabric when pulled by hand. A biofabricated material having zonal properties was formed. The untreated region will have higher adhesive strength than the periodate treated region.

Example 7

A fibrillated, cross-linked, and fat liquored collagen paste from Example 2 was foamed using a Powerlix handheld frother, after the addition of the textile binder, to create porosity. A second fibrillated, cross-linked, and fat liquored collagen paste from Example 2 was used. The two collagen pastes were applied side by side, allowed to come together in a central portion, allowed to dry to form a sheet. The sheet forms a biofabricated material with zonal properties, where the side with the porogen will have open pores and channels to provide breathability.

Example 8

A stencil with the letters MM in the center and rectangle border around the outside of the letters was placed on a piece of non-woven fabric. The paste from Example 2 was applied in the border around the letters. The stencil was removed and placed in the 100 F dehydrator for 1 to 3 hours. An acetate stencil was placed on the non-woven fabric to block the paste from flowing into the letters. The partially dry sample (300% dry content) was pressed in the carver press for 10 mins at 5 metric tons at room temperature. Then the paste from Example 8 was used to fill in the letters. The stencil was removed and placed in the 100 F dehydrator for 1 to 3 hours. An acetate stencil was placed on the non-woven fabric to block the paste from flowing into the border. The partially dry sample (300% dry content) was then pressed in the carver press for 10 mins at 5 metric tons at room temperature. The two regions were allowed to come together and meet. The sample was left at room temperature to dry completely. A biofabricated material having color zonal properties was formed.

Example 9

A stencil with the letters MM in the center and rectangle border around the outside of the letters was placed on a piece of non-woven fabric. The paste from Example 2 was applied in the border around the letters. The stencil was removed and placed in the 100° F. dehydrator for 1 to 3 hours. Then the paste from Example 8 was used to fill in the letters and the sample was left at room temperature to dry completely. The two regions were allowed to come together and meet. A biofabricated material having color zonal properties was formed.

We claim:

1. An article, comprising:
a material having zonal properties, the material comprising:
a first collagen-containing material comprising collagen attached to a first fabric material, the first collagen-containing material having a first set of material properties; and
a second collagen-containing material comprising collagen attached to a second fabric material, the second collagen-containing material having a second set of material properties, wherein at least one material property within the second set of material properties has a value that is different from the same property in the first set of material properties; and
wherein an edge of the first collagen-containing material and an edge of the second collagen-containing material are disposed side-by-side in a single layer.

2. The article of claim 1, wherein at least one of the first collagen-containing material or the second collagen-containing material comprises recombinant collagen.

3. The article of claim 2, wherein the recombinant collagen is selected from the group consisting of recombinant bovine collagen, recombinant porcine collagen, recombinant kangaroo collagen, recombinant sheep collagen, and combinations thereof.

4. The article of claim 2, wherein the recombinant collagen is recombinant Type III bovine collagen.

5. The article of claim 1, wherein the first set of material properties comprises color, breathability, stretchability, tear strength, softness, rigidity, abrasion resistance, luminescence, reflectance, and fragrance; and wherein the second set of material properties comprises color, breathability, stretchability, tear strength, softness, rigidity, abrasion resistance, luminescence, reflectance, and fragrance.

6. The article of claim 1, further comprising a substrate layer, wherein first collagen-containing material and the second collagen-containing material are bonded to the substrate layer.

7. The article of claim 6, wherein the substrate layer comprises a fabric.

8. The article of claim 1, wherein the first collagen-containing material comprises a first dried collagen paste, and wherein the second collagen-containing material comprises a second dried collagen paste.

9. The article of claim 8, wherein the first dried collagen paste and the second dried collagen paste comprise fibrillated collagen.

10. The article of claim 1, further comprising a gap between the edge of the first collagen-containing material and the edge of the second collagen-containing material, wherein the gap is filled with a collagen material.

11. The article of claim 1, wherein the second collagen-containing material surrounds the edge of the first collagen-containing material.

12. The article of claim 1, wherein the collagen attached to the first fabric material and the collagen attached to the second fabric material comprise fibrillated collagen.

13. A method of making a material having zonal properties,
the method comprising:
placing a first fabric material on a surface;
placing a second fabric material with different properties next to the first fabric material;
applying an aqueous solution of collagen over the two fabric materials to form:
a first collagen-containing material comprising collagen and the first fabric material, and
a second collagen-containing material comprising collagen and the second fabric material; and
drying the first collagen-containing material and the second collagen-containing material to form the material having zonal properties; wherein:
the first collagen-containing material has a first set of material properties;
the second collagen-containing material has a second set of material properties;
at least one material property within the second set of material properties has a value that is different from the same property in the first set of material properties; and
an edge of the first collagen-containing material and an edge of the second collagen-containing material are disposed side-by-side in a single layer.

14. The method of claim 13, wherein the first fabric material and the second fabric material are fibrous materials.

15. The method of claim 13, wherein the aqueous solution of collagen is a single aqueous solution of collagen that is poured over the first fabric material and the second fabric material.

* * * * *